(12) United States Patent
Vernal et al.

(10) Patent No.: US 7,949,720 B2
(45) Date of Patent: *May 24, 2011

(54) MESSAGE OBJECT MODEL

(75) Inventors: Michael S. Vernal, Seattle, WA (US); Aaron Stern, Bellevue, WA (US); Donald F. Box, Bellevue, WA (US); Erik B. Christensen, Seattle, WA (US); Kenneth D. Wolf, Seattle, WA (US); Michael J. Coulson, Clyde Hill, WA (US); Stefan H. Pharies, Zuerich (CH); Luis Filipe Cabrera, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 302 days.

This patent is subject to a terminal disclaimer.

(21) Appl. No.: 11/469,430

(22) Filed: Aug. 31, 2006

(65) Prior Publication Data
US 2007/0180043 A1   Aug. 2, 2007

Related U.S. Application Data

(60) Provisional application No. 60/764,127, filed on Jan. 31, 2006, provisional application No. 60/764,306, filed on Feb. 1, 2006.

(51) Int. Cl.
*G06F 15/16* (2006.01)
(52) U.S. Cl. ........ 709/207; 709/206; 709/217; 709/218; 709/219; 709/220; 709/227; 709/228; 709/229; 707/999.01; 707/999.107
(58) Field of Classification Search .......... 709/217–220, 709/227–229, 206–208; 707/10, 104.1, 999.01, 707/999.107
See application file for complete search history.

(56) References Cited

U.S. PATENT DOCUMENTS

| 5,583,859 A | 12/1996 | Feldmeier |
| 5,838,927 A | 11/1998 | Gillon |
| 5,923,846 A | 7/1999 | Gage |
| 6,178,504 B1 | 1/2001 | Fieres |
| 6,286,033 B1 | 9/2001 | Kishinsky |
| 6,321,252 B1 | 11/2001 | Bhola |

(Continued)

FOREIGN PATENT DOCUMENTS
WO   WO 02/01356   1/2002

OTHER PUBLICATIONS

Darryl K. Taft, "Microsoft Previews Web Services Kit," eWeek.com, Aug. 26, 2002, available at http://www.eweek.com/article2/0,3959,486118,00.asp, 3 Pages.

(Continued)

*Primary Examiner* — John Follansbee
*Assistant Examiner* — Saket K Daftuar
(74) *Attorney, Agent, or Firm* — Workman Nydegger

(57) ABSTRACT

Embodiments described herein provide for an overall object mode that allows for a single message object to represent multiple messaging formats. A general message object is populated with fields for multiple available messaging formats, which can be appropriately filled with information with fields for both versions 1.1 and 1.2. Depending on which version is being used or desired, the appropriate fields can be populated when creating an instance of the message object. The other fields that do not correspond to that version, however, are left blank.

10 Claims, 10 Drawing Sheets

U.S. PATENT DOCUMENTS

| | | | |
|---|---|---|---|
| 6,457,066 B1* | 9/2002 | Mein et al. | 719/330 |
| 6,732,175 B1* | 5/2004 | Abjanic | 709/227 |
| 6,748,431 B1 | 6/2004 | Fleig | |
| 6,904,600 B1* | 6/2005 | James et al. | 719/328 |
| 6,907,564 B1* | 6/2005 | Burchhardt et al. | 715/210 |
| 6,941,306 B2 | 9/2005 | Kim | 707/10 |
| 7,051,032 B2 | 5/2006 | Chu-Carrol | |
| 7,065,706 B1* | 6/2006 | Sankar | 715/234 |
| 7,069,335 B1* | 6/2006 | Layman et al. | 709/238 |
| 7,080,137 B2 | 7/2006 | Brault | |
| 7,089,533 B2 | 8/2006 | Vosburgh | |
| 7,114,147 B2 | 9/2006 | Ballantyne | |
| 7,124,299 B2* | 10/2006 | Dick et al. | 713/178 |
| 7,159,224 B2* | 1/2007 | Sharma et al. | 719/310 |
| 7,165,239 B2 | 1/2007 | Hejisberg | |
| 7,191,186 B1 | 3/2007 | Pullen | |
| 7,191,429 B2 | 3/2007 | Brassard | |
| 7,213,227 B2 | 5/2007 | Kompalli | |
| 7,237,014 B2 | 6/2007 | Drummond | |
| 7,246,358 B2* | 7/2007 | Chinnici et al. | 719/315 |
| 7,277,719 B2 | 10/2007 | Klassen | |
| 7,281,206 B2 | 10/2007 | Schnelle | |
| 7,289,498 B2 | 10/2007 | Yu et al. | |
| 7,296,226 B2* | 11/2007 | Junkermann | 715/249 |
| 7,302,492 B1* | 11/2007 | Day | 709/238 |
| 7,325,076 B1 | 1/2008 | Morrison | |
| 7,328,403 B2 | 2/2008 | Ramarao | |
| 7,418,485 B2* | 8/2008 | Payrits | 709/220 |
| 7,426,194 B2 | 9/2008 | Shenfield | |
| 7,437,434 B2 | 10/2008 | Zintel | |
| 7,448,043 B2 | 11/2008 | Shenfield | |
| 7,454,429 B2 | 11/2008 | Rojer | |
| 7,458,062 B2 | 11/2008 | Coulthard | |
| 7,464,097 B2* | 12/2008 | Goetz et al. | 1/1 |
| 7,483,994 B1* | 1/2009 | Stephens et al. | 709/230 |
| 7,509,651 B2* | 3/2009 | Catania et al. | 719/316 |
| 7,512,691 B2* | 3/2009 | Sohda et al. | 709/227 |
| 7,512,953 B1* | 3/2009 | Sabev | 719/316 |
| 7,512,957 B2 | 3/2009 | Cohen | |
| 7,516,198 B1* | 4/2009 | Appala et al. | 709/219 |
| 7,519,574 B2 | 4/2009 | Van Der Linden | |
| 7,533,264 B2 | 5/2009 | Ballinger | |
| 7,536,711 B2* | 5/2009 | Miyashita et al. | 726/3 |
| 7,539,982 B2 | 5/2009 | Stuart | |
| 7,571,426 B2 | 8/2009 | Carrol | |
| 7,603,658 B2 | 10/2009 | Subramanian | |
| 7,631,314 B2* | 12/2009 | Joseph et al. | 719/313 |
| 7,644,066 B2 | 1/2010 | Krishnaprasad | |
| 7,694,284 B2 | 4/2010 | Berg | |
| 2001/0049702 A1* | 12/2001 | Najmi | 707/513 |
| 2002/0032790 A1* | 3/2002 | Linderman | 709/230 |
| 2002/0046239 A1 | 4/2002 | Stawikowski | 709/203 |
| 2002/0046304 A1* | 4/2002 | Fabri et al. | 709/331 |
| 2002/0062451 A1 | 5/2002 | Scheidt | |
| 2002/0156871 A1* | 10/2002 | Munarriz et al. | 709/219 |
| 2002/0174340 A1* | 11/2002 | Dick et al. | 713/178 |
| 2003/0009572 A1* | 1/2003 | Thurner | 709/230 |
| 2003/0051008 A1 | 3/2003 | Gorthy | |
| 2003/0061405 A1 | 3/2003 | Fisher | |
| 2003/0069907 A1 | 4/2003 | Moreau | |
| 2003/0074648 A1 | 4/2003 | Brassard | |
| 2003/0093551 A1* | 5/2003 | Taylor et al. | 709/237 |
| 2003/0105654 A1* | 6/2003 | MacLeod et al. | 705/7 |
| 2003/0145101 A1 | 7/2003 | Mitchell | |
| 2003/0149781 A1 | 8/2003 | Yared | |
| 2003/0188156 A1 | 10/2003 | Yasala | |
| 2003/0204645 A1* | 10/2003 | Sharma et al. | 709/328 |
| 2003/0204721 A1 | 10/2003 | Barrus | |
| 2003/0217096 A1* | 11/2003 | McKelvie et al. | 709/202 |
| 2004/0044729 A1 | 3/2004 | Foerg | |
| 2004/0044985 A1 | 3/2004 | Kompalli | |
| 2004/0045005 A1* | 3/2004 | Karakashian | 719/310 |
| 2004/0054628 A1 | 3/2004 | de Jong | |
| 2004/0068586 A1* | 4/2004 | Xie et al. | 709/246 |
| 2004/0088395 A1* | 5/2004 | O'Konski et al. | 709/223 |
| 2004/0111474 A1 | 6/2004 | Kaler | |
| 2004/0148612 A1 | 7/2004 | Olsen | |
| 2004/0193635 A1 | 9/2004 | Hsu | |
| 2004/0193687 A1 | 9/2004 | Christensen | |
| 2004/0194111 A1 | 9/2004 | Marcey | |
| 2004/0205216 A1 | 10/2004 | Ballinger | |
| 2004/0267876 A1* | 12/2004 | Kakivaya et al. | 709/200 |
| 2005/0021799 A1* | 1/2005 | Imamura et al. | 709/230 |
| 2005/0050549 A1 | 3/2005 | Joseph et al. | 719/313 |
| 2005/0055345 A1 | 3/2005 | Ripley | |
| 2005/0055629 A1 | 3/2005 | Khaladkar | |
| 2005/0060431 A1 | 3/2005 | Lewontin | 709/246 |
| 2005/0091231 A1 | 4/2005 | Pal | |
| 2005/0097545 A1 | 5/2005 | Tarbox | |
| 2005/0144457 A1 | 6/2005 | Lee | |
| 2005/0182752 A1 | 8/2005 | Rojer | |
| 2005/0193291 A1 | 9/2005 | Subramanian | |
| 2005/0198154 A1* | 9/2005 | Xie et al. | 709/206 |
| 2005/0228787 A1 | 10/2005 | Linden | |
| 2005/0240555 A1 | 10/2005 | Wilde | |
| 2005/0257193 A1 | 11/2005 | Falk | |
| 2005/0262049 A1 | 11/2005 | Somppi | |
| 2005/0278358 A1 | 12/2005 | Doughan | |
| 2006/0004827 A1 | 1/2006 | Stuart | |
| 2006/0015847 A1 | 1/2006 | Carrol | |
| 2006/0036754 A1 | 2/2006 | Itoh et al. | 709/230 |
| 2006/0041579 A1* | 2/2006 | Miyashita et al. | 707/102 |
| 2006/0041838 A1 | 2/2006 | Khan | |
| 2006/0064667 A1 | 3/2006 | Freitas | |
| 2006/0075117 A1* | 4/2006 | Sohda et al. | 709/227 |
| 2006/0123039 A1 | 6/2006 | Scheuerle | |
| 2006/0129971 A1 | 6/2006 | Rojer | |
| 2006/0130058 A1 | 6/2006 | Tarbox | |
| 2006/0168511 A1 | 7/2006 | Bauer | |
| 2006/0221966 A1 | 10/2006 | Basso et al. | |
| 2006/0265689 A1* | 11/2006 | Kuznetsov et al. | 717/117 |
| 2007/0067492 A1* | 3/2007 | Muraki et al. | 709/246 |
| 2007/0073753 A1 | 3/2007 | Baikov | |
| 2007/0073760 A1 | 3/2007 | Baikov | |
| 2007/0098018 A1* | 5/2007 | Kaler et al. | 370/477 |
| 2007/0121585 A1 | 5/2007 | Morrissey | |
| 2007/0124725 A1* | 5/2007 | Wang et al. | 717/114 |
| 2007/0130155 A1* | 6/2007 | Alperin et al. | 707/10 |
| 2007/0133763 A1* | 6/2007 | D'Angelo et al. | 379/93.02 |
| 2007/0143331 A1 | 6/2007 | Holtz | |
| 2007/0143393 A1* | 6/2007 | Brunswig et al. | 709/203 |
| 2007/0156872 A1* | 7/2007 | Stoyanova | 709/223 |
| 2007/0174288 A1* | 7/2007 | Stoyanova | 707/10 |
| 2007/0174763 A1 | 7/2007 | Chang | |
| 2008/0010629 A1 | 1/2008 | Berg | |
| 2008/0278740 A1* | 11/2008 | Bird et al. | 358/1.15 |
| 2008/0313282 A1* | 12/2008 | Warila et al. | 709/206 |

OTHER PUBLICATIONS

"Microsoft Announces Web Services Development Kit Technology Preview" Aug. 26, 2002, Available at http://xml.coverpages.org/nl2002-08-26-c.html 4 Pages.

Office Action dated Jan. 22, 2009 cited in U.S. Appl. No. 11/469,433.

Office Action dated Jun. 22, 2009 cited in U.S. Appl. No. 11/469,442.

Office Action dated Jun. 25, 2009 cited in U.S. Appl. No. 11/469,437.

Office Action dated Jul. 23, 2009 cited in U.S. Appl. No. 11/469,433.

De Lancie, Phillip, "Streaming Media Matures", Econtent, Aug. 2002, Col. 25, No. 8, pp. 22-23, 26-29.

Hoff, Dianne; Marchio, Doug; and Hafford, Justin; Anytime, Anywhere: The Power of Video Streaming:, Teaching and Learning in a Network World, TechEd 2000 Proceedings, Mar. 6-9, 2000, pp. 87-92.

Gailey, Jeannie Hall; "DIME—Sending Files, Attachements and SOAP Messages Via Direct Internet Message Encapsulation," MSDN Magazine, Dec. 2002, vol. 17, No. 12, pp. 54-60.

Powell, Matt; "Understanding DIME and WS-Attachements" <http://msdn.microsoft.com/library/wn-us/dnwebsrv/html/DIMEWSattach.asp?frmae=true>, visited Mar. 19, 2003.

Nielsen, Henirk Frystyk; Christensen, Erik; and Farrell, Joel; "WS Attachements", <http://ietf.org/internet-drafts/draft-nielsen-dime-soap-01.txt> visited Mar. 19, 2003.

Nielsen, Henirk Frystyk; Sanders, Henery; Butek, Russell; and Nash, Simon; "Direct Internet Message Encapsulation (DIME)", <http://ietf.org/internet-drafts/draft-nielsen-dinme-02.txt, visited Mar. 19, 2003.

Nielsen, Henrik and Ruellan, Herve; "SOAP1.2 Attachement Feature W3C Working Draft", Sep. 24, 2002, W3C. pp. 1-10.
Office Action dated Oct. 15, 2009 cited in U.S. Appl. No. 11/469,439.
Office Action dated Sep. 3, 2009 cited in U.S. Appl. No. 11/469,446.
Office Action dated Aug. 22, 2006 cited in U.S. Appl. No. 10/391,838.
Office Action dated Apr. 30, 2007 cited in U.S. Appl. No. 10/391,838.
Office Action dated Oct. 29, 2007 cited in U.S. Appl. No. 10/391,838.
Office Action dated May 6, 2008 cited in U.S. Appl. No. 10/391,838.
Office Action dated Dec. 8, 2009 cited in U.S. Appl. No. 11/469,442.
Office Action dated Jan. 5, 2010 cited in U.S. Appl. No. 11/469,446.
Office Action dated Jan. 20, 2010 cited in U.S. Appl. No. 11/469,433.
Office Action dated Feb. 3, 2010 cited in U.S. Appl. No. 11/469,437.
Office Action dated Feb. 19, 2010 cited in U.S. Appl. No. 11/469,439.
Office Action dated Mar. 31, 2010 cited in U.S. Appl. No. 11/469,433.
Office Action dated Mar. 25, 2010 cited in U.S. Appl. No. 10/391,838.
U.S. Appl. No. 11/469,442, filed May 24, 2010, Notice of Allowance.
U.S. Appl. No. 11/469,446, filed May 26, 2010, Office Action.
U.S. Appl. No. 11/469,437, filed Jun. 22, 2010, Office Action.
Towards the Integration of Web Services Securtiy on Enterprise Environments Yuichi Nakamur, Satoshi Hada & Ryo Neyama IBM Research, Tokyo Research Laboratory 2002 IEEE p. 166 to 175.
Kent et al., IP Encapsulating Security Payload (ESP), Nov. 1998, Network Working Group, RFC 2406.
U.S. Appl. No. 11/469,433, filed Dec. 14, 2010, Notice of Allowance.
U.S. Appl. No. 11/469,439, filed Dec. 21, 2010, Office Action.
U.S. Appl. No. 10/645,375, filed Jan. 8, 2007, Office Action.
U.S. Appl. No. 10/645,375, filed Jul. 30, 2007, Office Action.
U.S. Appl. No. 10/645,375, filed Jan. 16, 2008, Office Action.
U.S. Appl. No. 10/645,375, filed Aug. 13, 2008, Office Action.
U.S. Appl. No. 10/645,375, filed Mar. 6, 2009, Notice of Allowance.
U.S. Appl. No. 11/469,437, filed Nov. 16, 2010, Office Action.
U.S. Appl. No. 11/469,446, filed Nov. 9, 2010, Office Action.
Frank Cohen, "*Discover SOAP Encoding's Impact on Web Service Performance,*" available at http://www-128.ibm.com/developerworks/library/ws-soapenc/ (PDF enclosed entitled "Article 1," 6 pgs.), Mar. 1, 2003.
Li et al., "*XML Protocol SOAP Envelope and Encoding*)," Institute of Information Science and Technology, Ningbo University, available at http://unpan1.un.org/intradoc/groups/public/documents/un/unpan001227.pdf (PDF enclosed entitled "Article 2," 8 pgs.), submitted Sep. 6, 2006.
Lee et al., "*An Architecture Model for Dynamically Converting Components into Web Services,*" IEEE Computer Society, Proceedings of the 11th Asia-Pacific Software Engineering Conference, available at http://ieeexplore.ieee.org/ie15/9444/29994/01371982.pdf?isNumber= (PDF enclosed entitled "Article 3," 7 pgs.), submitted Sep. 6, 2006.
Duftler et al., "*Web Services Invocation Framework (WSIF)*," IBM T.J. Watson Research Center, Aug. 9, 2001, available at http://www.extreme.indiana.edu/~aslom/papers/oopsla2001_workshop_wsif.pdf (PDF enclosed entitled "Article 4," 8 pgs.).
U.S. Appl. No. 11/469,422, filed Jul. 30, 2010, Notice of Allowance.
U.S. Appl. No. 10/391,838, filed Aug. 30, 2010, Office Action.
U.S. Appl. No. 11/469,433, filed Sep. 14, 2010, Office Action.

* cited by examiner

MESSAGE OBJECT MODEL

CROSS-REFERENCE TO RELATED APPLICATIONS

The application claims priority to U.S. Provisional Application Nos. filed 60/764,127 and 60/764,306 filed Jan. 31, 2006 and Feb. 1, 2006, respectively, both entitled "MESSAGE OBJECT MODELING, FORMATTING, AND ENCODING", the contents of each are incorporated herein by reference in their entirety. This application also related to the following U.S. patent application Ser Nos. 11/469,433, 11/469,437, 11/469,439, 11/469,446, and 11/469,442, filed on the same day herewith and entitled "SIMULTANEOUS API EXPOSURE FOR MESSAGES ", "PARTIAL MESSAGE STREAMING", "ANNOTATING PORTIONS OF A MESSAGE WITH STATE PROPERTIES", "MESSAGE CONTRACT PROGRAMMING MODEL", and "VARYING OF MESSAGE ENCODING", respectively, the contents of each are also incorporated herein by reference in their entirety.

BACKGROUND

Computer networks have enhanced our ability to communicate and access information by allowing one computer or device to communicate over a network with another computing system using electronic messages. When transferring an electronic message between computing systems, the electronic message will often pass through a protocol stack that performs operations on the date within the electronic message (e.g., parsing, routing, flow control, etc.). The Open System Interconnect (OSI) model is an example of a network framework for implementing a protocol stack.

The OSI model breaks down the operations for transferring an electronic message into seven distinct layers, each designated to perform certain operations in the data transfer process. While protocol stacks can potentially implement each of the layers, many protocol stacks implement only selective layers for use in transferring data across a network. When data is transmitted from a computing system, it originates at the application layer and is passed down to intermediate lower layers and then onto a network. When data is received from a network it enters the physical layer and is passed up to the higher intermediate layers and then is eventually received at that application layer. The application layer—the upper most layer—is responsible for supporting application and end-user processing. Further, within the application layer there may reside several other layers (e.g., the Simple Open Access Protocol (SOAP) layer). Another layer incorporated by most protocol stacks is the transport layer. An example of a transport layer is the Transmission Control Protocol (TCP).

A system that relies heavily on such communication or stack protocol is known as Web services. Web services have been a driving force in advancing communications between computing systems and are turning the way we build and use software inside-out. More specifically, web services let applications share data and—more powerfully—invoke capabilities from other applications without regard to how these applications where built, what operating systems or platform they run on; and what devices are used to access them. Web services are invoked over the Internet by means of industry-standard protocols including SOAP, XML (eXtensible Markup Language), UDDI (Universal Description, Discovery and Integration), WSDL (Web Service Description Language), etc. Although web services remain independent of each other, they can loosely link themselves into a collaborating group that performs a particular task.

Current web service technologies offer direct SOAP-message communication between an initiator (e.g., a client) and an acceptor) e.g., a service). SOAP is a lightweight protocol intended for exchanging structured information in a decentralized, distributed environment. It uses XML technologies to define an extensible messaging framework providing a message contract that can be exchanged over a variety of underlying protocols. SOAP provides a way to communicate between applications running on different operating systems, with different technologies and programming languages. Accordingly, SOAP is platform and language agnostic, yet simple and extensible.

The current SOAP specification defines a message construct in an open-ended manner. More specifically, SOAP defines a message to be an XML infoset with a set of optional message headers followed by a message body. The current specification, however, does not place any requirements on how to map objects (in the sense of object-oriented programming) to SOAP messages or back again. Further, it does not place any requirements on how to map the SOAP infoset to raw octets (for message transmission). IN addition, it does not place any maximum size on a SOAP message. Accordingly, in order to implement SOAP and integrate it into an object-oriented programming model, these are all problems on must solve.

BRIEF SUMMARY

The above-identified deficiencies and drawback of current message modeling systems are overcome through example embodiments of the present invention. For example, embodiments described herein provide for a single message class that represents multiple messaging formats. Not that this Summary is provided to introduce a selection of concepts in a simplified form that are further described below in the Detailed Description. This Summary is not intended to identify key features or essential features of the claimed subject matter, not is it intended to be used as an aid in determining the scope of the claimed subject matter.

In accordance with a first example embodiment, the single message class includes an envelope that encapsulates contents for a message. The single message class further includes a first set of fields within the envelope configured to include data for elements that correspond to a first message format. In addition, the single message class includes a second set of fields, within the envelope configured to include data for elements that correspond to a second message format, wherein either the first set of fields, or the second set of fields can be populated with data to create a message object specific to either the first or second message format, respectively.

Another example embodiment provides for a method of using the single message class described above to create a message object that is specific to a formats. In this embodiment, a request to create a message object that is specific to a first message format is received. Next, a message class is accessed that includes an envelope, the envelope including a first set of fields configured to include data for elements that correspond to a first message format and a second set of fields configured to include data for elements that correspond to a second message format. Because the request to create the message object is specific to the first message format, the first set of fields is populates with data for making a message object specific to the first format, wherein field(s) from the second set of fields are not populated.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
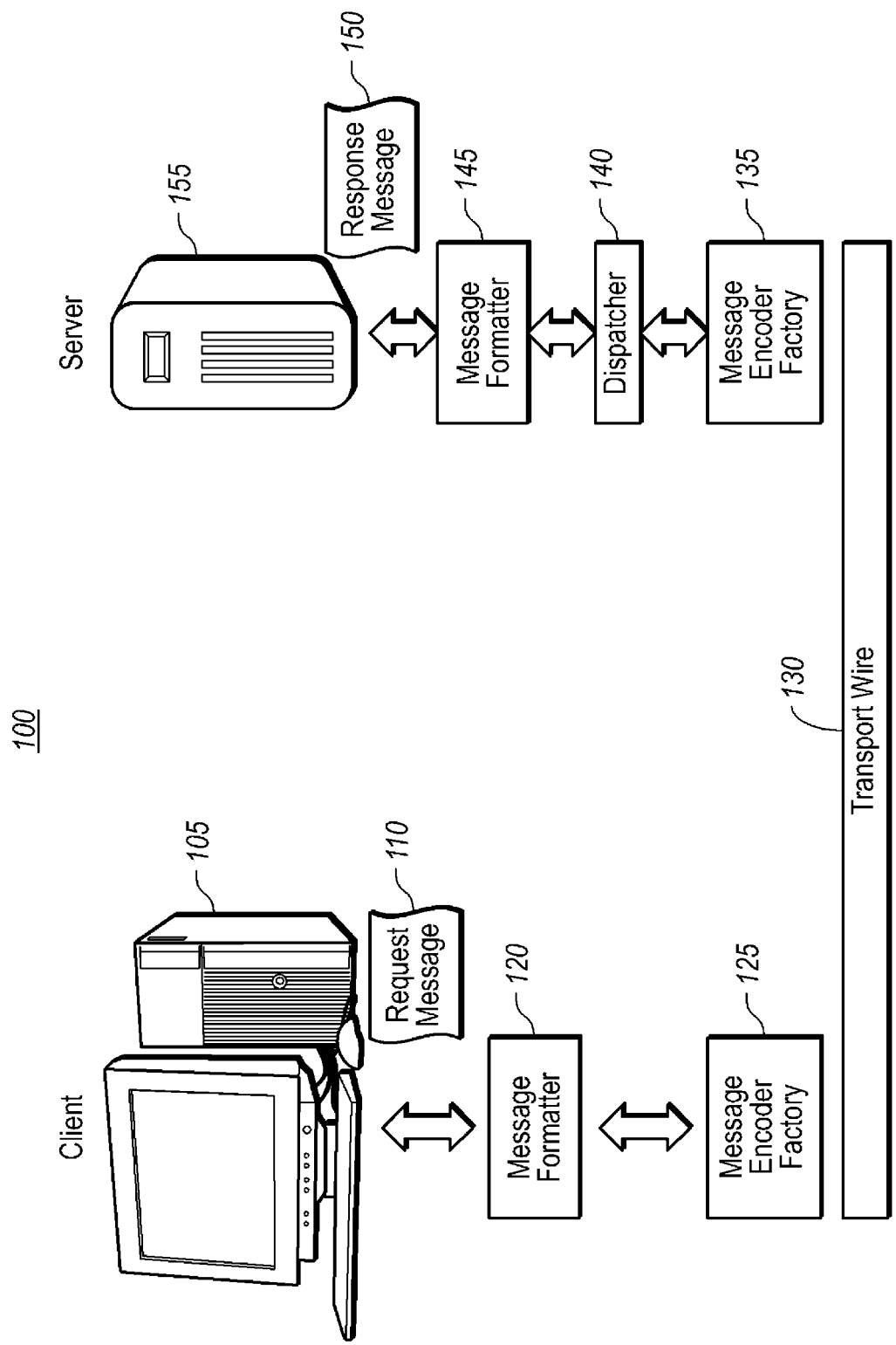
FIG. 1 illustrates a distributed system configured to utilize an open-ended object model in accordance with example embodiments.

The present invention extends to methods, systems, and computer program products for modeling, formatting, and encoding messages, e.g., SOAP, in a distributed system. The embodiments of the present invention may comprise a special purpose or general-purpose computer including various computer hardware or modules, as discussed in greater detail below.

Embodiments described herein generally relate to a messaging in a distributed system. A message provides the fundamental unit of communication between endpoints in a distributed service system, e.g., web services. That is, it is the container within which data exchanged between services is encapsulated. The structure of a message as described herein loosely corresponds to that of the SOAP envelope. A message may contain both a set of message headers and a body, which can correspond to the SOAP Header blocks and the SOAP Body, respectively. Note that although some embodiments may be described in terms of SOAP protocol, embodiments herein are not necessarily limited to SOAP messaging unless otherwise explicitly claimed.

Regardless of the type of message, one embodiment as described in greater detail below provides for an overall object model that allows for a single message object to represent multiple messaging formats. In this example, the general message object is populated with fields for multiple available messaging formats, which can be appropriately filled with information depending on the desired format. For example, a SOAP object may be provided with fields for both versions 1.1 and 1.2. Depending on which version is being used or desired, the appropriate fields can be populated when creating an instance of the message object.

In another embodiment, a message object is provided that simultaneously exposes an XML view and Type view for a message infoset. In this embodiment, interaction with a message can occur using either an XML or Type application program interface (API), which are synced. More specifically, embodiments herein provide or expose a common set of headers (e.g., SOAP headers) as "typed" properties (e.g., CLR properties), which allow for getting and/or setting a value thereof. In other words, the type API reads/writes values for typed properties without regard to how the message is encoded with XML. Moreover, the two APIs are synced such that a value can be set using one API and retrieved using the other. For example, an XML API may be used as a writing mechanism for interacting with a value, while the Type API can read that same value, and vise-versa.

Embodiments provided herein also support large messages by formatting at least a portion of the message in the form of a transport stream. That is, embodiments provide a SOAP model that can stream an object for a message without loading the entire message into an intermediate buffer. Accordingly, one embodiment supports loading SOAP headers into memory, yet streaming the body. This would allow, for example, large attachments (e.g., video file) to accompany the SOAP message in the body, while still supporting random access to message headers. Accordingly, embodiments provide a SOAP data model that allows a developer to create an object and specify whether or not portions of the message should be buffered or streamed.

In yet another embodiment, the headers of a SOAP or other message may be referenced using an in memory index. Accordingly, memory needed for buffering a message may be further reduced, yet still providing for random access to the headers. In this embodiment, rather than using a document object model (DOM) to store the content (e.g., attributes, elements, values, etc.) of each header, a set of references or an index of headers (such as a header number) may be stored as a byte array.

Still other example embodiments provide that as a SOAP message is processed, various states known as properties can be attached to the message for various purposes. In other words, embodiments provide for a properties object that represents a set of processing-level annotations to a message. These properties (representing the processing state of the headers or other portions of the message) can then be used by other component or modules for further processing purposes. Typically, these properties can then be removed (or sustained if desired) prior to transporting the SOAP message on the wire.

In another example embodiment, a message contract programming model is provided, which is a mechanism for service developers to control the processing, layout, and creation of messages (e.g., SOAP) without losing the benefits of a strongly-typed data contract model. Such programming model is based on attributes, which can be used to define the action or operations, headers, and body parts components of a message. These attributes may be used on a type annotated with message contract or on a service operation to control the manner in which the message (e.g., SOAP) is constructed from a service process, process parameters, and/or return values. The use of the message contract in conjunction with a message formatter as defined herein provides for many advantageous features and embodiments described in greater detail below.

Another embodiment as described herein allows a user to vary the encoding of a message object rather than being bound to a specific one, e.g., the text encoding for SOAP messaging. Accordingly, a message encoding factory is provided that is responsible for mapping a message object (e.g., SOAP Infoset) into raw octets suitable for wire transmission. By encapsulating the notion of a message encoder factory abstractly, embodiments allow users to vary the encoding of an Infoset without varying the programming model (or any other aspect of the system that uses message). In other words, embodiments herein separate the transport (e.g., TCP, HTTP, etc.) from the encoding, which allows users to use any number of encoding mechanisms—even their own proprietary ones.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly view the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features, and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

FIG. 1 illustrates a distributed system 100, wherein a client 105 sends requests messages 110 to a service 155, which replies with response messages 150. Note that although embodiments are described in terms of a request-response protocol, other message exchange patterns are also contemplated herein. Regardless of the type of exchange pattern, embodiments described herein provides for an overall message object model that allows for efficiently representing, processing, formatting, and encoding messages. Note that the following description of embodiments provided herein will occasionally refer to components and modules from FIG. 1. Note, however, that other configurations and designs choices are also available to embodiments described herein, and as such the modules and layout of the distributed system in FIG. 1 is for illustrative purposes only.

A message e.g., request message 110, or response message 150, provides the fundamental unit of communication between endpoints 105, 155 in a distributed service system 100, e.g., web services. That is, it is the container within which all data exchange between services is encapsulated. The structure of a message loosely corresponds to that of the SOAP envelope. A message contains both a set of message headers and a body, which can correspond to the SOAP header blocks and the SOAP body, respectively.

One problem associated with current messaging models is that in order to communicate with messages that support multiple format protocols, one needs to create code paths for the various formats provided. For example, when creating a SOAP message envelope, one needs to specify and support a particular version of the SOAP message (e.g., v. 1.1 or 1.2). As multiple formats are extended, however, the code breaks and must be modified for supporting such updates. Accordingly, embodiments provide for an object model that defines a single message class or object for representing multiple message format protocols.

Such object model includes multiple fields that support each of the multiple formats. For example, if one version or format of a message requires or supports fields A, B, and D, while another one requires or supports C, D, and E, the single message class should include fields for A, B, C, D, and E. Those fields that do not apply to a format desired for a message can be ignored. Accordingly, the single object can be used to create a message for a specific format as needed. In other words, as a user creates a message, or as a stream of data is received for compilation into a message, the single message object can be used to create a format specific message based on the supported formats therein.

Another problem with current message object models is that the message infoset is exposed as an XML data object. Accordingly, XML, APIs (i.e., XML readers/writers) are used for processing a message, e.g., SOAP, which must create XML data objects for each port of the XML content. By reducing the overall allocation per message, however, embodiments herein allow for improved performance considerations.

For example, a common way to represent a SOAP Infoset as an instance or implementation of a common language infrastructure (CLI) object (e.g., a common language runtime (CLR) object) would be in terms of the basic XML APIs (e.g., XmlReader/XmlWriter). For instance, one can retrieve the value of a web service addressing "ReplyTo" header as follows:

```
// Option 1:
  int index = message.Headers.FindHeader("ReplyTo",
"http://schemas.xmlsoap.org/ws/2004/08/addressing/");
  XmlDictionaryReader reader =
  message.Headers.GetReaderAtHeader(index);
  EndpointAddress ReplyTo = EndpointAddress.ReadFrom(reader);
```

In this example, first an index to the header is found via the XML qualified name or QName (name, namespace). Next, an XmlDictionaryReader (a specialization of XmlReader) is retrieved for that particular header, which is then passed into the EndpointAddress.ReadFrom ( . . . )method to create a typed representation of that header.

Embodiments herein not only support the above mechanism for interacting with a value within a message, but also provide a "Type" API for an infoset that reads/writes values for typed properties without regard to how the message is encoded with XML. In other words, embodiments herein provide or expose a common set of headers (e.g., SOAP headers) as "typed" properties (e.g., CLR properties), which allow for getting and/or setting a value thereof. For example, the above equivalent of retrieving the value of a web service addressing "ReplyTo" header can now be accomplished using something similar to the following:

```
// Option 2:
  EndpointAddress ReplyTo = message.Headers.ReplyTo;
```

Note that embodiments simultaneously expose both the XML and Type APIs, and the two can be synced and used such that they mismatch the reading/writing of a message. More specifically, a value can be set using one API and retrieved using the other. For example, from the above, the ReplyTo header may be created using the XML APIs, and the value thereof can then be retrieved using type property message Headers.ReplyTo, and vice-versa. Accordingly, one can interact with these common headers within an infoset with either API, depending on their preference. Note that although the typed property is shown as a uniform resource identifier (URI) string, other types are also available to this and other embodiments described herein.

Another problem with current messaging models is that a complete message must be buffered before it can be sent across the wire. As such, messages of large size require large memory, which may put some size limitations on a SOAP message and consume large amounts of valuable system resources. In other words, a large message may not be fully represented in memory at one moment in time, which is to say that the size of the message is larger than the memory available to the service processing the message. This memory limitation may be due to the physical limitations of an endpoint such as the node hosting the service or some configured maximum buffer size specified by the service or endpoint.

Accordingly, embodiments provided herein support large messages by formatting at least a portion of the message in the form of a transport stream. That is, embodiments provide a SOAP model that can stream an object for a message without loading the entire message into an intermediate buffer. Accordingly, one embodiment supports loading SOAP headers into memory, yet streaming the body. This would allow, for example, large attachments (e.g., a video file) to accompany the SOAP message in the body, while still supporting random access to message headers. Accordingly, embodiments provide a SOAP data model that allows a developer to create an object and specify whether or not portions of the message should be buffered or streamed.

Note that this embodiment of SOAP message streaming involves the use of a transport connection (TCP socket, named pipe, HTTP connection) that is typically dedicated to stream the message. Accordingly, in order to make of use transport streaming, the transports utilized by a client and server should be configured to support streaming. This may be done, e.g., via transfer mode property of a channel factory and/or channel listener (e.g., TCP, named pipe, HTTP, or other transport channel/factory setting). Of course other mechanisms for setting this feature are also contemplated herein. For example, this feature may also be enabled via the transport binding elements (e.g., TcpTransportBindingElement, NamedPipeTransportBindingElement, HttpTransportBindingElement, etc.). In addition, transport streaming may be enabled via the service binding or by some other mechanism. Accordingly, the above mechanisms used for enabling the embodiment of streaming a message are used herein for illustrative purposes and are not meant to limit or otherwise narrow the scope of these embodiments.

In one embodiment, a transport connection is closed at the conclusion of a message transmission in order to notify the receiver that the transmission is complete. Note that in such case, streaming may be limited to use with certain channel types. Nevertheless, embodiments herein support multiple transports and exchange patterns. For example, when utilizing TCP or named pipes, request/reply channel, output/input channel (which can be built on top of request/reply channel) or full duplex channel (which uses a pair of output/input channels) may be supported. Further, when utilizing HTTP request/reply channels or request/reply session channels may be supported. Of course, other transports and exchange patterns are also supported herein. Note, however, that when streaming is configured for a given contract/binding, embodiments automatically ensure that the proper channel type can be requested and created.

Note that there may be some limitations that developers should consider when using this above streaming model for SOAP messages. For example, some security, reliability, and/ or other protocols may not be supported when streaming a message. For example, some web service security protocols require the whole message to be buffered and some reliability protocols require the message be completely read before sending acknowledgements. Nevertheless, embodiments provide that the transport security and/or reliability may need to be used with streaming in order to overcome some of these limitations.

The following provides some pseudo-code for a SOAP message transport streaming API and some streaming examples. Note that the following are examples only and are not meant to limit or otherwise narrow the scope of embodiments unless otherwise explicitly claimed.

Transport Streaming API Example

```
namespace System.ServiceModel
{
  // Existing class
  public class Message
  {
    //Pulls the data from the provided XmlReader to populate the body
    static public Message CreateMessage(string action,
      XmlReader body);
    //Allows the developer to write directly to the body (push)
    static public Message CreateMessage(string action,
      IBodyWriter writer);
    //same as above, but takes a message version
    static public Message CreateMessage(MessageVersion version, string action, XmlReader body);
    static public Message CreateMessage(MessageVersion version, string action, IBodyWriter writer);
  }
  //implemented by the developer enable the push scenario
  //Message will call the WriteBody implementation when the Message is written out
  interface IBodyWriter
  {
    void WriteBody(XmlWriter writer);
  }
  //Existing class
  public class TcpTransportBindingElement : TransportBindingElement
  {
    //Allows the developer to state if the transport supports streaming
    //Buffered may be the default
    public TransferMode Mode { get; set; }
  }
  //Existing class
  public class NamedPipeTransportBindingElement :
    TransportBindingElement
  {
    //Allows the developer to state if the transport supports streaming
    //Buffered may be the default
    public TransferMode Mode { get; set; }
  }
  public class HttpTransportBindingElement :
    TransportBindingElement
  {
    //Allows the developer to state if the transport supports streaming
    //Buffered may be the default
    public TransferMode Mode { get; set; }
  }
}
namespace System.ServiceModel.Channels
{
  //TransferMode is typed to this enum
  public enum TransferMode
  {
    Buffered,
    Streamed,
    StreamedRequest,
    StreamedResponse,
  }
}
```

Transport Streaming Examples

```
[ServiceContract]
public interface IPurchaseOrderContract
{
    //use a message directly
    [OperationContract(IsOneWay = true)]
    void ProcessLargeOrder(Message msg);
}
  class PurchaseOrderProxy : ClientBase< IPurchaseOrderContract>,
IPurchaseOrderContract
  {
    public PurchaseOrderProxy( )
      : base( )
    {
    }
    public PurchaseOrderProxy (string configurationName)
      : base(configurationName)
    {
    }
    public PurchaseOrderProxy (Binding binding, EndpointAddress address)
      : base(binding, address)
    {
    }
    public void ProcessLargeOrder(Message message)
    {
      base.InnerProxy. ProcessLargeOrder(message);
    }
  }
  class PurchaseOrderService : IPurchaseOrderContract
  {
    public static void Main( )
    {
```

```
            ServiceHost service = new ServiceHost(typeof(PurchaseOrderService),
"net.tcp://localhost/");
            //configure the transport to use streaming
        Binding streamedBinding = new NetTcpBinding( );
        streamedBinding.TransferMode = TransferMode.Streamed;
        service.AddServiceEndpoint(typeof(IPurchaseOrderContract), streamedBinding,
"/IPurchaseOrderService");
            service.Open( );
            PurchaseOrderProxy server = new
PurchaseOrderProxy(streamedBinding, new
EndpointAddress("net.tcp://localhost/IPurchaseOrderService/"));
            //open a stream to a large business document on disk
            using (XmlTextReader reader = new XmlTextReader(@"d:\po.xml"))
            {
                //set message body
                Message msg =
Message.CreateMessage("http://processlargeorder", reader);
                //stream the data to the server
                server.ProcessLargeOrder(msg);
            }
        }
        public void ProcessLargeOrder(Message msg)
        {
            XmlReader reader = msg.GetBodyReader( );
            while (reader.Read( ))
            {
                Console.WriteLine(reader.Value);
            }
        }
}
[ServiceContract]
public interface IMovieContract
{
        [OperationContract]
        Message GetMovie(string movie);
}
   class MovieProxy : ClientBase< IMovieContract>, IMovieContract
   {
     public MovieProxy( )
        : base( )
     {
     }
     public MovieProxy(string configurationName)
        : base(configurationName)
     {
     }
     public MovieProxy(Binding binding, EndpointAddress address)
        : base(binding, address)
     {
     }
     public Message GetMovie(string movie)
     {
       Return base.InnerProxy.GetMovie(movie);
     }
   }
class MovieService : IMovieContract
{
        public static void Main( )
        {
            ServiceHost service = new ServiceHost(typeof(MovieService),
"net.pipe://localhost/");
        Binding streamedBinding = new NetNamedPipeBinding( );
        streamedBinding.TransferMode = TransferMode.Streamed;
        service.AddServiceEndpoint(typeof(IMovieContract), streamedBinding,
"/IMovieService");
            service.Open( );
            MovieProxy server =
               new MovieProxy(streamedBinding, new
EndpointAddress("net.pipe://localhost/IMovieService/"));
          //ask for the movie and get the message
          Message msg = server.GetMovie("pulp_fiction.mpeg");
          //get a reference to the reader
          XmlDictionaryReader reader = msg.GetBodyReader( );
          //pulls the data from the stream and unencodes the bytes (method omitted
- see StreamBodyWriter to send side)
          ShowMovie(reader);
        }
     public Message GetMovie(string movie)
     {
        //open a stream to the movie
```

```
        FileStream stream = File.OpenRead(movie);
        //create IBodyWriter implementation that copies from the Stream to the
XmlWriter
        //send the message
        return Message.CreateMessage("http://GetMovieResponse", new
StreamBodyWriter(stream));
    }
}
//Copies the data from a stream to an XmlWriter
public class StreamBodyWriter : IBodyWriter
{
    Stream _stream;
    public StreamBodyWriter(Stream stream) { _stream = stream; }
    public void Write(XmlWriter writer)
    {
        int blockSize = 4096;
        int bytesRead = 0;
        byte[ ] block = new byte[blockSize];
        do
        {
            bytesRead = _stream.Read(block, 0, blockSize);
            writer.WriteBase64(block, 0, bytesRead);
        } while (bytesRead > 0);
    }
}
```

In yet another embodiment, the headers of a SOAP or other message may be referenced using an in memory index. As such, memory needed for buffering a message may be further reduced, yet still providing for random access to the headers. In one embodiment, rather than using a document object model (DOM) to store the content (e.g., attributes, elements, values, etc.) of each header, a set of references or an index of headers identifiers (e.g., name and/or namespace) may be stored and the contents of the message stored as a byte array. In other words, rather than taking the original buffer and transforming it into some other completely separate data structure, embodiments reference the original buffer as an array by maintaining the header information in an index. For example, the Qname of the header and a reference for what order the header appears in may be used as the reference number for accessing the header. Accordingly, when the XML reader (or writer as the case may be) needs to access the header, the reference number can be retrieved and the contents for the header accessed based thereon. As can be seen, because embodiments are able to randomly access and read headers on the fly, without building up an intermediate data structure for the contents of the headers, this feature provides for some important performance enhancements.

Still other example embodiments provide that as a SOAP message is processed, various states known as properties can be attached to the message for internal and external purposes. In other words, embodiments provide for a properties object that represents a set of processing-level annotations to a message. These properties (representing the processing state of the headers or other portions of a message) can then be used by other component or modules for further processing purposes. For example, such things as whether a message is secure, the message identifier, or other information may be attached as a property to the message. Typically, these properties can then be removed (or sustained if desired) prior to transporting the SOAP message on the wire. Accordingly, these properties provide for processing efficiencies, yet also allow for applying these efficiencies in a confidential and secure manner.

For example, as a message makes it way through the Channel infrastructure, it passes through a number of logically separate processing entities. For instance, a message that is part of a messaging stream may potentially pass through a message formatter 120, 145, a transport-level channel, any channel extensions that are installed, a reliable messaging channel, any channel extensions that are installed there, the streaming channel, a dispatcher 140, etc. Embodiments herein allow a piece of code that processes a message to annotate it with the results of that processing. Accordingly, message properties can appear as an annotation to the message and are typically stored as a set of name -> object mappings in a properties object on message.

As noted above, properties typically represent the processing state of headers of a message, however, they can also represent processing state of other portions of a message. For example, the properties may relate to the body or relate to environmental information about how a message was received off the wire (e.g., local IP address, TCP vs. UDP, HTTP headers, etc. In addition, note that a message property may be marked to indicate that either it should or should not persist in the message upon serialization. This may be done either by the user or automatically by the system. Note that a default may also be set, such that a property or state information that is not specifically marked is removed or lost upon or before serialization. This may be an appropriate decision if the message property contains sensitive key information, for instance.

Also note that one distinction between headers and properties (other than the one that headers are remain upon serialization) is that headers are typically version specific, where properties are version neutral. For example, by inspecting an addressing header directly, it may preclude talking to endpoints of a specific web service addressing version. Properties, on the other hand, are not version dependent, thus minimizing code needed to understand different versions or formats.

The following gives an example of a class used to set and/or get message properties in accordance with example embodiments. As with other pseudo-code provided herein, the following is one of many example design patterns to make setting/getting properties; however, such implementation is not means to limit the scope of the property embodiment described herein.

```
class FooProperty
{
    public static string PropertyName { get { return "Foo"; } }
    public static FooProperty Get(Message message)
    {
        return (FooProperty)
            message.Properties.[PropertyName];
    }
    public static void Set(Message message, FooProperty property)
    {
        return message.Properties[PropertyName] = property;
    }
}
```

In another example embodiment, a message contract programming model is provided, which is a mechanism for service developers to control the processing, layout, and creation of messages (e.g., SOAP) without losing the benefits of a strongly-typed data contract model. Such programming model is based on attributes (e.g., CLR attributes), which can be used to define the action or operations, headers, and body part components of a message. These attributes may be used on a type annotated with message contract or on a service operation to control the manner in which the message (e.g., SOAP) is constructed from a service process, process parameters, and/or return values. The use of the message contract in conjunction with a message formatter 120, 145 as defined herein provides for many advantageous features and embodiments.

Figure 2A:
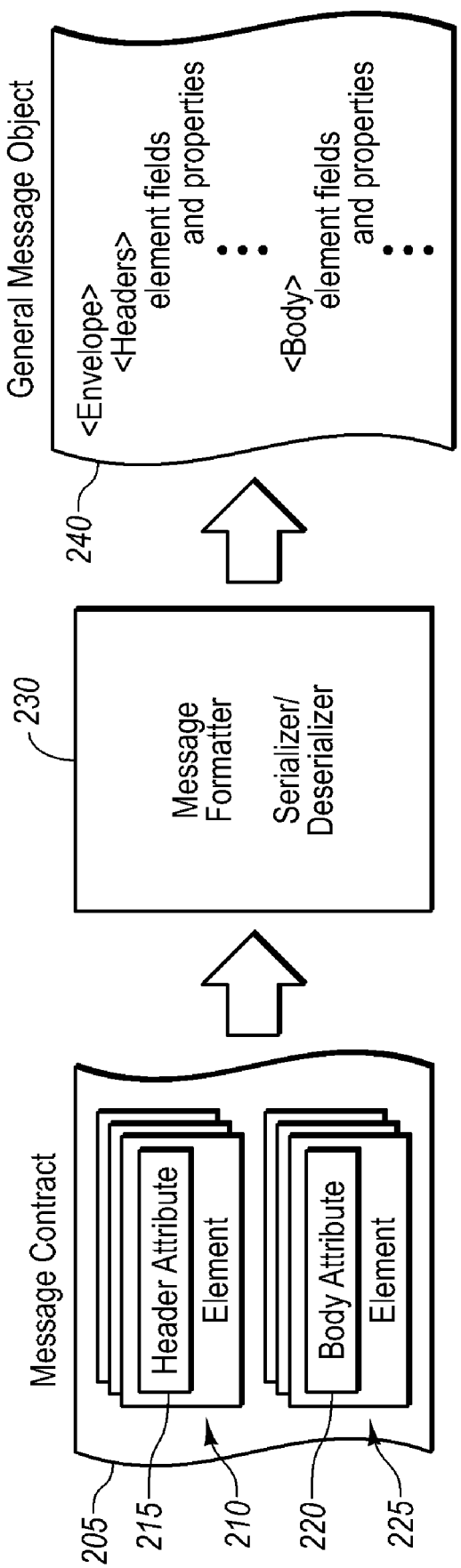
FIG. 2A illustrates the use of a message contract to create a general message object in accordance with example embodiments.

For example, the message contract may be used to generate a general message object. For instance, as shown in FIG. 2A, a message contract 205 defined by a contract attribute provides a class with various elements 210, 225 (e.g., types or structs with fields, properties, and/or events). A developer is allowed to decorate such elements with a header attribute 215 or body attribute 220. Message formatter 230 can then parse the message contract 205 to generate a general message object 240. More specifically, message formatter 230 serializes (or deserializes as the case may be) the envelope of the general message object 240 with headers and body element types (e.g., fields, properties, events, etc.) as defined by the contract attributes.

For instance, a developer may define a contract 205 for a general class of person, which includes elements of first name, last name, age, etc. By attaching the header attribute to these elements and processing the message contract 205 using message formatter 230, a message object of a person can be created or serialized that includes header tags with element fields and properties for each of a first name, last name, age, etc.

It should be noted that although embodiments herein discuss separate modules for message layout and wire transformation (i.e., formatters 120, 145 and message encoder factories 125, 135), these and other modules may be combined into a single component, and thus interchangeable. Nevertheless, the term "formatter" will typically be used to describe the layout of a message or message object (i.e., the serialization/deserialization of how the message looks), whereas the "encoding" of a message will typically describe how the message looks on the wire or communication channel. Encoding is also used herein to refer to transforming messages to various types, e.g., SOAP, SMTP, MSMQ, etc.

Figure 2B:
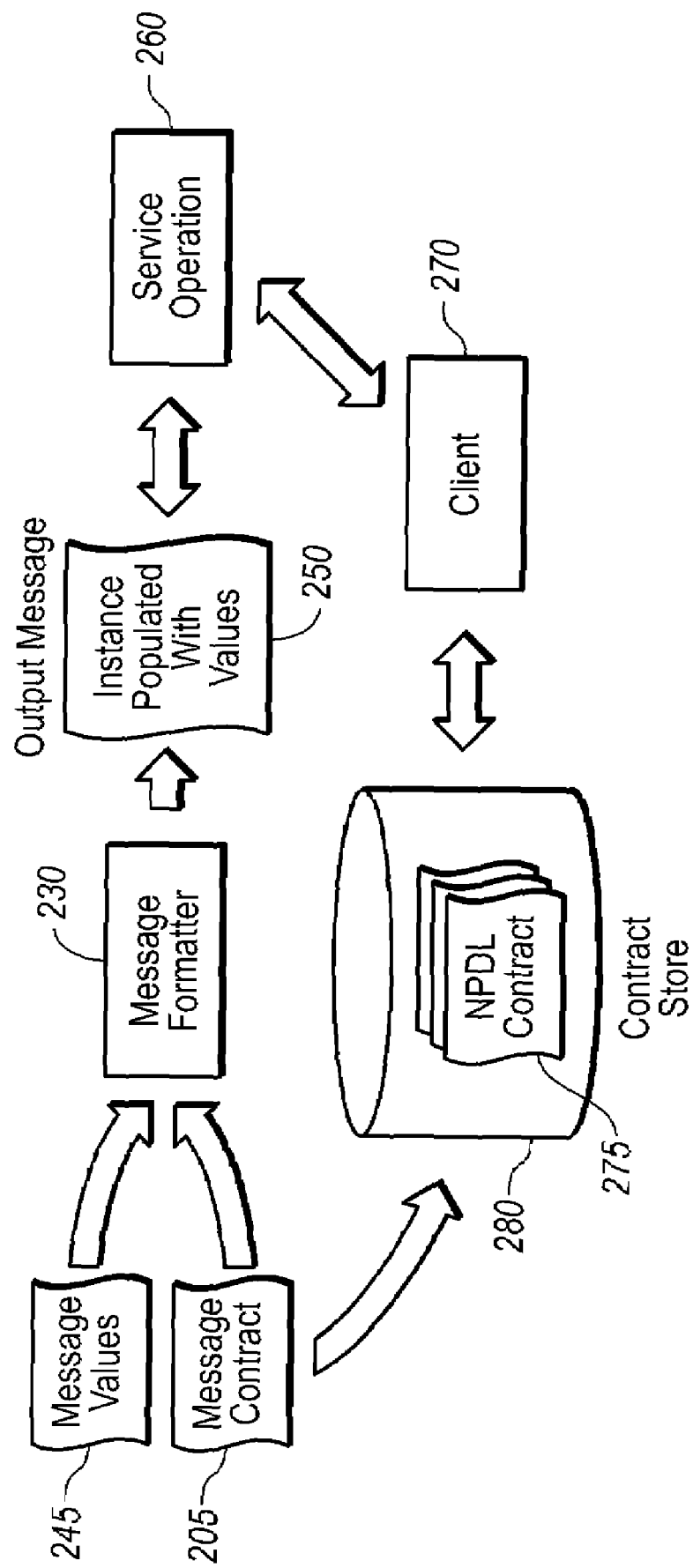
FIG. 2B illustrates using a message formatter for communication with a service operation in accordance with example embodiments.

In another embodiment, the message contract 205 may be used in conjunction with message values to create an instance output message. In other words, by providing values to the mappings of the attributes for the message contract 205, an instance of the message object 240 can be created. For example, as shown in FIG. 2B, message values 245 and message contract 205 may be received as inputs to message formatter 230. Type message converter or message formatter 230 can then populate a message object (e.g., message object 240) with the values provide to create an instance output message 250.

For example, using again the above person infoset class with elements of first name, last name, and age, message values 245 may define one set of these elements as Jim, Jones, and 25, respectively. As such, by decorating the message contract 205 with the appropriate header attributes 215 for the corresponding elements, and providing the formatter with a message 245 that defines the values for these elements, an output message 250 can be automatically generated as XML (or type properties as noted above) headers similar to the following:

```
<envelope>
    <headers>
        <first_name>Jim</first_name>
        <last_name>Jones</last_name>
        <age>25</age>
        ...
    </headers>
    <body>...</body>
</envelope>
```

Such message may then be used by an endpoint (e.g., service operation 260) for desired processing purposes.

Note that although the above/subsequent formatting examples where/are described generally in terms of serialization (i.e., creation of a message), embodiments used herein also apply to deserialization, just in reverse ordering of processing. For example, in the above creation of the output message 250, the output message 250 in conjunction with the message contract 205 may be used to extract message values 245. Of course as one would recognize, and as described in greater detail below, other uses of the message formatter 230 and the object models used herein may also be applied to a deserialization process. Accordingly, any specific illustrative purposes only and is not meant to limit the claims herein.

Note that the message contract programming model described herein also allows a developer to control the manner in which an operation's parameters (service inputs) and return values (service output) are serialized/deserialized to/from headers and body parts of a message. Accordingly, similar to above, a data contract parameter(s) or return value(s) may be annotated with a header or body attribute for specifying or controlling various aspects of the message. In one embodiment, parameters and return values without message contract 205 attributes 215, 230 are subject to a default serialization/deserialization rule(s)—e.g., wrapped and placed as a list within the body (e.g., child of a SOAP body); however, other defaults (e.g., placing them in a special header) are also contemplated herein.

In another embodiment, message contract 205 may be used to automatically create a network protocol description language (NPDL) document for a service 155 (e.g., WSDL document, XSD (XML Schema Definition), or other contracts). A client 105 can use such document to determine how to appropriately format a message for requesting 110 offered service operations 260. Accordingly, the message contract 205 provides a single attribute for both the serialization/deserialization and also for describing the NPDL contract 275. Further, the message contract 205 may include additional metadata that can also be used to generate the appropriate NPDL contract 275 operations/messages/message parts, which can then be retrieved from contract store 280 and used by client 270 for communicating with service operation 260.

The following describes in greater detail the general formatting (e.g., creation and use of message contract) embodiments described above. Note that although reference to a specific implementation (e.g., naming convention) may be used, such use is meant for illustrative purposes only.

As previously mentioned, a message contract 205 is an abstract contract describing the message format or layout (e.g., SOAP message headers and body parts). One or more of the following conditions may be needed for a type (e.g., CLR type) to implement a message contract (1) the type should be annotated with the message contract attribute; (2) fields and/or properties to be included in the message contract should have either message header or message body attributes; (3) zero or more fields/properties can have message body attribute; (4) zero or more fields/properties can have message body attribute; (5) one or more fields or properties can be of type list type for an XML element and have a message headers attribute; and in addition, such fields and/or properties should be typed to one of the primitive types supported by a data contract or a type that implements the data contract. The following gives some examples of some of the above conditions.

As previously mentioned, defining a message contract 205 is a matter of decorating a class (e.g., with message contract attribute and decorating one or more of the class's elements (e.g., fields or properties) with message body and/or header attributes. For example the following defines a generalized message contract 205.

```
[MessageContract(ActionUri="http://createpersonrequest")]
Name="CreatePersonRequest")]
public sealed class CreatePersonRequest {
    [MessageBody(NamespaceUri = "http://namespace",
        Name = "MyData", Position = 2)]
    public string OptionalData;
    [MessageBody(NamespaceUri = "http://namespace",
        Name = "TheList")]
    public List<int> Ids;
}
``` that when formatted and populated with values can map to the following SOAP message.

```
<soap:Envelope
    xmlns:soap='http://schemas.xmlsoap.org/soap/envelope/'
    xmlns:wsa='http://schemas.xmlsoap.org/ws/2004/03/addressing'>
    <soap:Header>
        <!-- ... other headers omitted for brevity -->
        <wsa:Action>http://createpersonrequest</wsa:Action>
    </soap:Header>
    <soap:Body xmlns:x='http://namespace'>
        <x:TheList>
            <x:Item>5</x:Item>
            <x:Item>10</x:Item>
        </x:TheList>
        <x:MyData>some data here</x:MyData>
    </soap:Body>
</soap:Envelope>
```

In order to use a message contract type in an operation or process, the operation should have at least one (and possibly only one) parameter. Further, both the return type and the parameter type, if present, should be message contract types. For example, suppose that BankingTransaction and BankingTransactionResponse are both types that have message contracts. Then, the following operations are typically considered valid.

```
[OperationContract]
BankingTransactionResponse Process(BankingTransaction bt);
[OperationContract]
void Store(BankingTransaction bt);
[OperationContract]
BankingTransactionResponse GetResponse( );
```

Note that another embodiment also provides that if a type has both a message contract and a data contract, then the message contract is considered when the type is used in an operation. Note, however, that the opposite result may also apply, i.e., the data contract may be considered when the type is used in the operation.

As previously mentioned, embodiments define a message contract 205 for a type (i.e. define the mapping between the type and a message, e.g., SOAP) envelope), by allowing a developer to apply the message contract attribute to the type. Further, embodiments allow a developer to apply the message header attribute to those members or elements of the type for which message (e.g., SOAP) headers are desired, and also allow a developer to apply the message body attribute to those members or elements that are targeted for parts of the message body. For example, consider the following type that has been made into a message contract 205.

```
[MessageContract]
public class BankingTransaction
{
    [MessageHeader] public Operation operation;
    [MessageBody] private Account sourceAccount;
    [MessageBody] private Account targetAccount;
    [MessageBody] public int amount;
}
```

When using this class or type as an operation parameter, a SOAP envelope can be generated with an extra header called "operation", "process", or the like, which will typically include the contents of the "operation" field. On the other hand, a message or SOAP body should include the contents of the "sourceAccount", "targetAccount", and "amount" fields. For example, the above message contract may result in the following XML message.

```
<header>
    <operation>some action</operation>
</header>
<body>
    <sourceAccount>some data</sourceAccount>
    <targetAccount>some data</targetAccount>
    <amount>some data</amount>
</body>
```

Notice that the default name for entries in this example is the name of the member or element to which the message header or body attribute is applied. As will be described in greater detail below, however, other embodiments allow for the name to be specified using a naming property on a portion of the message class. Also note that the message header and body attributes can be applied to all fields, properties, and events, regardless of whether they are public, private, protected or internal.

Other embodiments provide that the order of the header or body elements may have a default setting, e.g., alphabetical, but may be controlled by an order property on message header or body attribute. For instance, in the example above, "amount" would come first since it is first alphabetically. To have the body order "sourceAccount", then "targetAccount", and then "amount", the message contract may be change to something similar to the following.

```
[MessageContract]
public class BankingTransaction
{
    [MessageHeader] public Operation operation;
    [MessageBody(Order=1)] public Account sourceAccount;
    [MessageBody(Order=2)] public Account targetAccount;
    [MessageBody(Order=3)] public int amount;
}
```

Note, however, that there are other mechanisms and syntactics for ordering or otherwise positioning how elements will map to the message. Accordingly, the above is used for illustrative purposes only and is not meant to limit or otherwise narrow the scope of this embodiment.

Other embodiments also allow for the message header and body attributes to apply the arrays of repeating elements in message contracts. For example, one way to use a message header and/or body attribute is to annotate it directly on the array. In such case, the entire array can be serialized as one element (i.e. one header or one body part) with multiple child elements. For example, consider the following class:

```
[MessageContract]
public class BankingDeopsitLog
{
    [MessageHeader] public int numRecords
    [MessageHeader] public DepositRecord records[ ];
    [Messageheader] public int branchID;
}
```

This class when given specific values can result in an XML message body similar to the following:

```
<numRecords>3</numRecords>
<records>
    <DepositRecord>Record1</DepositRecord>
    <DepositRecord>Record2</DepositRecord>
    <DepositRecord>Record3</DepositRecord>
</records>
<branchID>20643</branchID>
```

As an alternative to the above, other embodiments provide for a message header or body array attribute. In this case, each array element can be serialized independently, and thus there will be one header or one body part per array element. For example, consider the following class:

```
[MessageContract]
public class BankingDeopsitLog
{
    [MessageHeader] public int numRecords
    [MessageHeaderArray] public DepositRecord records[ ];
    [MessageHeader] public int branchID;
}
```

This may result in a SOAP or body similar to the following:

```
<numRecords>3</numRecords>
<records>Record1</records>
<records>Record2</records>
<records>Record3</records>
<branchID>20643</branchID>
```

Notice that the default name for array entries is the name of the member to which the message header and/or body array attribute is applied. Similar to above, however, such default may be overridden by applying a naming property on a portion of the message contract, e.g., message header and/or body array attribute.

Embodiments also provide that the message header and/or body array attributes inherit from the message header and/or body attributes, respectively. Thus, they have a similar set of features as the non-array attributes. For example, it is possible to set the order, name, and/or namespace for an array of headers/body parts in similar manner as noted above for a single header/body part. Note, however, that when the order property is used on an array, it typically applies to the entire array as a whole—although other embodiments also allow for a mechanism for ordering each element within the array.

Other embodiments provide that bye arrays, when used with the non-array attributes (message header and/or body attributes), may not be treated as arrays but as a special primitive type represented as base64-enclosed data in the resulting XML. On the other hand, when bye arrays are used with the array attributes (message header and/or body array attributes), the results may vary. For example, one embodiment allows for the array to be represented as an individual entry for each byte. Another embodiment, however, provides that byte arrays can be treated as base64 data regardless of whether the array or non-array attributes are used. For example, consider the following class.

```
[MessageContract]
public class ProductData
{
    [MessageBody] byte[ ] Image;
    [MessageBodyArray] byte[ ] productCode;
}
```

Answering that the array is to be represented as an individual entry for each byte, the message body may look similar to the following:

```
<Image>p4m2rrULt3f==</Image>
<productCode>32</productCode>
<productCode>255</productCode>
<productCode>17</productCode>
```

Still other embodiments allow a message contract to indicate whether the headers and/or the body of the message should be digitally signed and encrypted. For example, provided herein is a setting of a protection level property on the message header and/or body attributes. Note that one embodiment provides that the property can be set to none )no encryption or signature), sign (digital signature only), or encrypt and sign (both encryption and a digital signature). The default may be none. For these security features to work, the binding and behaviors may have to be properly configured. Embodiments provide that an exception may be thrown if use of these security features is attempted without a proper configuration (for example, attempting to sign a message without supplying your credentials).

The protection level may be determined for each header individually. The body, however, typically has one protection level regardless of the number of body parts—although embodiments consider setting different levels for different body parts. Further, one embodiment provides that the protection level of the body can be determined by the highest protection level property setting of all the body parts. For example consider the following class:

```
[MessageContract]
public class PatientRecord
{
    [MessageHeader(ProtectionLevel=None)] public int recordID;
    [MessageHeader(ProtectionLevel=Sign)] public string
patientName;
    [MessageHeader(ProtectionLevel=EncryptAndSign)] public string
SSN;
    [MessageBody(ProtectionLevel=None)] public string comments;
    [MessageBody(ProtectionLevel=Sign)] public string diagnosis;
    [MessageBody(ProtectionLevel=EncryptAndSign)] public string
medicalHistory;
}
```

In this example, the recordID header will not be protected, patientName will be signed, and SSN will be encrypted and signed. There is at least one body part, medicalHistory, with encrypt and sign, and thus the above embodiment provides that entire message body should be encrypted and signed, even though the comments and diagnosis body parts specify lower protection levels. As noted above, however, embodiments do allow for the individual portions of the body to be secured by the various protection levels.

As previously noted in the message (e.g., SOAP) representation of a message contract, each header and body part maps to an XML element which typically has a qualified name (e.g., Qname including name and a namespace). One embodiment provides that by default, the namespace can be the same as the namespace of the service contract that the message is participating in, and the name can be determined by the member or element name to which the message header and/or body attributes are applied. Of course, other embodiments allow the defaults to be changed by manipulating name and/or namespace properties of the either the message header/body attributes or the message contract element attribute, which is the parent class of the message header/body attributes. For example, consider the following class:

```
[MessageContract]
public class BankingTransaction
{
    [MessageHeader] public Operation operation;
    [MessageHeader(Namespace="http://schemas.contosobank.com/
auditing/2005")] public bool IsAudited;
    [MessageBody] public Account sourceAccount;
    [MessageBody] public Account targetAccount;
    [MessageBody(Name="transactionAmount")] public int amount;
}
```

In this example, the IsAudited header will be in the namespace specified in the code, and the body part representing the "amount" member will be represented by an XML element with the name "transactionAmount".

Note that SOAP and related web services standards define a property called "action" that can be present for every SOAP message sent. Accordingly, embodiments herein provide that the value of this property is controllable. For example, the action property may either be controlled through an operation contract attribute, or by setting the action property on the message contract attribute that is applied to the message contract type used in the operation. If both are set, the embodiments provide that a default one may be used, for example, the message contract attribute action setting can be used.

The SOAP standard defines the following attributes that may exist on a header: Actor/Role (Actor in SOAP 1.1, Role in SOAP 1.2). MustUnderstand; and Relay. The Actor or Role attribute specifies the URI of the node for which a given header is intended. The MustUnderstand attribute specifies whether or not the node processing the header must understand it. The Relay attribute specifies whether the header is to be relayed to downstream nodes.

Embodiments herein provide for not performing processing on one or more of these attributes on incoming messages. One exception, however, may be the MustUnderstand attribute a specified below in the section that discusses message contract versioning. Nevertheless, embodiments allow a developer to read and write these attributes as they wish, as described below.

One embodiment states that when sending a message, these attributes should not be emitted by default. Other embodiments, however, provide mechanisms to change this. For example, one embodiment allows for statistically setting the attributes to any desired values by changing the Actor, MustUnderstand, and/or Relay properties on the message header attribute. For example:

```
[MessageContract]
public class BankingTransaction
{
    [MessageHeader(Actor="http://auditingservice.contosobank.com",
MustUnderstand=true)] public bool IsAudited;
    [MessageHeader] public Operation operation;
    [MessageBody] public Account sourceAccount;
    [MessageBody] public Account targetAccount;
    [MessageBody] public int amount;
}
```

Another embodiment allows for controlling these attributes dynamically, e.g., through code. This may be achieved by wrapping the desired header type in the generic message header type (not to be confused with the non-generic version) and using the type together with the message header attribute. Then, properties on the message header can be used to set the SOAP attributes. For example:

```
[MessageContract]
public class BankingTransaction
{
    [MessageHeader] public MessageHeader<bool> IsAudited;
    [MessageHeader] public Operation operation;
    [MessageBody] public Account sourceAccount;
    [MessageBody] public Account targetAccount;
    [MessageBody] public int amount;
}
//... application code:
BankingTransaction bt = new BankingTransaction( );
bt.IsAudited = new MessageHeader<bool>( );
bt.IsAudited.Content = false; //Set IsAudited header value to "false"
```

-continued

```
bt.IsAudited.Actor="http://auditingservice.contosobank.com";
bt.IsAudited.MustUnderstand=true;
```

If both the dynamic and the static control mechanisms are used, embodiments allow for a default setting (e.g., static setting are used as a default), which can be overridden using the opposite (e.g., dynamic) mechanism. For example:

```
[MessageHeader(MustUnderstand=true)] public MessageHeader<Person>
documentApprover;
//... later on in the code:
BankingTransaction bt = new BankingTransaction( );
bt.documentApprover= new MessageHeader<Person>( );
bt.documentApprover.MustUnderstand=false; //override the static default
of 'true'
```

Other embodiments also allow for creating repeated headers with dynamic attribute control, for example:

```
[MessageHeaderArray] public MessageHeader<Person>
    documentApprovers[ ];
```

Occasionally, message contracts may need to change. For example, a future version of an application may add an extra header to a message. Then, when sending from the new version to the old, an extra header will have to be dealt with, and going in the other direction there will be a missing header. Embodiments provide for a set of rules for versioning headers as follows. The serialization/deserialization or message formatter 230 may not cause an error for missing headers, but rather the corresponding members may be simply left at their default values. Further, embodiments may ignore extra headers that are not expected. As mentioned above, the one exception to this rule may be if the extra header has a MustUnderstand attribute set to true in the incoming SOAP message. In this case, an exception may be thrown since a header that must be understood cannot be processed.

As described below, other embodiments allow for the modification the message contract through various configuration mechanisms. More specifically, well known mechanisms such as configuration files may be available to allow administrators and other users to modify the message contract as needed (for example, to accommodate more or less headers described above). In other words, the above embodiments may be programmatically implemented, but also supported herein are configuration settings that allow these features to be implemented and modified at deployment time. Such embodiments, therefore, allow for the decoupling of the developed code from the environment that the code is executed in.

Other embodiments allow a message contract type to inherit from another type, provides the base type also has a message contract. When creating or consuming a message using a message contract type that inherits from other message contract types, the following rules may apply. First, message headers in the inheritance hierarchy can be collected together to form the full set of headers for the message. Also, message body parts in the inheritance hierarchy can be collected together to form the full message body. The body parts are ordered according to the usual ordering rules (by Order and then alphabetical), with no regards to their place in the inheritance hierarchy. Next, if a base class and a derived class define a header or a body part with the same name, the member or element from the base-most class will be used to store the value of that header or body part.

For example, consider the following classes:

```
[MessageContract]
public class PersonRecord
{
    [MessageHeader(Name="ID")] public int personID;
    [MessageBody] public string patientName;
}
[MessageContract]
public class PatientRecord : PersonRecord
{
    [MessageHeader(Name="ID")] public int patientID;
    [MessageBody] public string diagnosis;
}
```

The PatientRecord class describes a message with one header called "ID". The header corresponds to the personID and not the patient ID member, since the base-most member is chosen. Thus, the patient ID field is useless in this case. The body of the message should contain the "diagnosis" element following by the "patientName" element, since that is the alphabetical order.

As previously mentioned, the message contract and metadata associated therewith can be used to create a NPDL contract, e.g., a WSDL document, XSD document, etc. When generating a WSDL contract from a service that uses message contracts, not that not all message contract features may be reflected in the resulting WSDL. Accordingly, the following are some points to keep in mind. First, WSDL cannot express the notion of an array of headers. When creating messages with an array of headers using the MessageHeaderArrayAttribute, the resulting WSDL will probably only reflect one header instead of the array. Next, some protection level information may not be reflected in the resulting WSDL document. In addition, the message type generated in the WSDL may have the same name as the class name of the message contract type. Something else to consider is when using the same message contract in multiple operations, multiple message types will be generated in the WSDL document. The names may be made unique by adding the numbers "2", "3", and so on for subsequent uses. When reporting back the WSDL, multiple message contract types can be created, almost identical except for their names.

Note that each message header and message body part is serialized independently of the others. Therefore, the same namespaces may be re-declared for each header and body part. To improve performance, especially in terms of the size of the message on the wire, embodiments provide for consolidating multiple headers and body parts into a single header or body part. For example, instead of this:

```
[MessageContract]
public class BankingTransaction
{
    [MessageHeader] public Operation operation;
    [MessageBody] public Account sourceAccount;
    [MessageBody] public Account targetAccount;
    [MessageBody] public int amount;
}
```

Embodiments can modify the class to this:

```
[MessageContract]
public class BankingTransaction
{
    [MessageHeader] public Operation operation;
    [MessageBody] public OperationDetails details;
}
[DataContract]
public class OperationDetails
{
    [DataMember] public Account sourceAccount;
    [DataMember] public Account targetAccount;
    [DataMember] public int amount;
}
```

Another embodiment as described herein allows a user to vary the encoding of a message object rather than being bound to a specific one, e.g., the text encoding for SOAP messaging. As shown in FIG. 1, a message encoding factory 125, 135 is provided that is responsible for mapping a message object (e.g., SOAP Infoset) into raw octets suitable for wire 130 transmission. By encapsulating the notion of a message encoder 125, 135 abstractly, embodiments allow users to vary the encoding of an infoset without varying the programming model (or any other aspect of the system that uses message). In other words, embodiments herein separate the transport (e.g., TCP, HTTP, etc.) from the encoding, which allows users to use any number of encoding mechanisms.

For example, a user may wish to use a text-based encoding for interoperability purposes or a binary-based encoding for performance or other reasons. Alternatively, a user may want to use a MTOM (Message Transmission Optimization Mechanism) encoding mechanism, which is a combination of XML text and binary, or the user may want to use their own proprietary encoding. Accordingly, embodiments support any number of encoding mechanisms and allow the extensibility thereof.

In addition, embodiments also contemplate setting a particular encoding as a default setting when one is not specified by the user. Note that the default may be based on the particular transport used. For example, when using HTTP transport XML text-encoding may be set as the default; however, when using TCP, the default may be binary-based encoding. In still another embodiment, the transport may be automatically chosen based on a priority level of the transport relative to the encoding selected. For example, if binary-based encoding is selected, TCP or named pipes transports might have a higher preference ranking. If these are not available, however, other transports that are lower ranked may be used.

The following provides some pseudo-code, tables, and examples for various encoding embodiments as described herein. As with other embodiments, the examples are used for illustrative purposes only and are not meant to limit or otherwise narrow embodiments herein unless explicitly claimed.

If a text/XML message encoder is desired for transferring a message (e.g., a service contract) across the wire 130, then no action may be necessary if either HTTP or UDP are used, since these are the default transports for such encoding. If on the other hand TCP, named pipes, or some other proprietary transport is used, then the message should expose the encoding by include a text message encoding attribute (note that other mechanisms for setting the type of encoding are also contemplated herein). The following table illustrates example priorities that may be set for transports of text/XML-based encoding (note again that these example priorities are for illustrative purposes only).

| Transport | Priority |
| --- | --- |
| HTTP | 1 |
| UDP | 1 |
| TCP | 3 |
| Named Pipes | 3 |
| Custom Transport | 2 |

If a binary-based encoder is desired for transferring a message (e.g., a service contract) across the wire 130, then no action may be necessary if either TCP or named pipes are used. If on the other hand HTTP or some other proprietary transport is used, then the message should expose the encoding by include a binary-based encoding attribute. Note that UDP (or some other transport as the case may be) may not be a supported transport for this type of encoding. Nevertheless, as the industry evolves and changes occur (e.g., binary is supported in UDP), embodiments herein allow for the modification to update such priority basis. The following table illustrates example priorities that may be set for transports of binary-based encoding (note again that these example priorities and unsupported transports are for illustrative purposes only).

| Transport | Priority |
| --- | --- |
| TCP | 1 |
| Named Pipes | 1 |
| HTTP | 3 |
| UDP | Not Supported |
| Custom Transport | 2 |

Note that although not specifically called out, other transports may be prioritized for other encoding types (e.g., MTOM). Further note that the prioritizations may be modified by a user based on their own personal preferences. Accordingly, the above tables that show examples of prioritized transports based on the type of encoding are used herein for illustrative purposes and are not meant to limit or otherwise narrow such embodiment.

Message encoder is a base class for implementation that may support a MIME content type and message version, and serialize/deserialize messages according to that content type. Note that the pseudo-code for the general message encoder API below uses properties listed in the following table:

| Property | Description | Type |
| --- | --- | --- |
| CharSet | Character Set supported (or "" if not applicable). Example: utf8 | String |
| ContentType | Full MIME Content Type supported. Example: "application/soap+xml; charset='utf8'" | String |
| MediaType | Media Type supported. Example: "application/soap+xml" | String |
| MessageVersion | Message Version supported (1.1 or 1.2). | MessageVersion |

The following shows various example message encoder API and bindings in accordance with example embodiments. Note that, as with other pseudo-code described herein, any specific use of a particular naming or attribute of an element is for illustrative purposes only and that other similar programs may be developed for implementing embodiments described herein. Accordingly, the following example pseudo-code should not be construed to in any way limit embodiments claimed herein.

First Example Message Encoder API

```
namespace System.ServiceModel.Channels
{
using System;
    using System.IO;
    public abstract class MessageEncoder
    {
        // a value like "utf8" (or "" if the format does not support charsets)
        public abstract string CharSet { get; }
        // a value like "application/soap+xml; charset="utf8"".
        public abstract string ContentType { get; }
    // a value like "application/soap+xml".
    public abstract string MediaType { get; }
    public abstract MessageVersion MessageVersion { get; }
    public bool IsContentTypeSupported(string contentType)
    {
        throw new NotImplementedException( );
    }
    public override string ToString( )
    {
        throw new NotImplementedException( );
    }
    // streamed message support
    public abstract Message ReadMessage(Stream stream, int maxSizeOfHeaders);
    public abstract void WriteMessage(Message message, Stream stream);
    // buffered message support
    public abstract Message ReadMessage(ArraySegment<byte> buffer, IBufferManager bufferManager);
        public ArraySegment<byte> WriteMessage(Message message, int maxMessageSize, IBufferManager bufferManager)
    {
        throw new NotImplementedException( );
    }
    public abstract ArraySegment<byte> WriteMessage(Message message, int maxMessageSize, IBufferManager bufferManager, int messageOffset);
    }
}
```

Second Example Message Encoder API

```
{
  using System;
  using System.IO;
  using System.Net.Mime;
  using System.Runtime.Serialization;
  using System.ServiceModel.Diagnostics;
  public abstract class MessageEncoder
  {
    public abstract string ContentType { get; }
    public abstract string MediaType { get; }
    public abstract MessageVersion MessageVersion { get; }
    public abstract Message ReadMessage(Stream stream, int maxSizeOfHeaders);
    public abstract Message ReadMessage(ArraySegment<byte> buffer, BufferManager bufferManager);
    public override string ToString( )
    {
      throw new NotImplementedException( );
    }
    public abstract void WriteMessage(Message message, Stream stream);
    public ArraySegment<byte> WriteMessage(Message message, int maxMessageSize, BufferManager bufferManager)
    {
      throw new NotImplementedException( );
    }
    public abstract ArraySegment<byte> WriteMessage(Message message, int maxMessageSize,
        BufferManager bufferManager, int messageOffset);
    public virtual bool IsContentTypeSupported(string contentType)
    {
      throw new NotImplementedException( );
    }
  }
}
```

Example Message Encoding Binding Element

```
namespace System.ServiceModel.Channels
{
  using System.Collections.Generic;
  using System.ServiceModel.Description;
  using System.Runtime.Serialization;
  using System.ServiceModel;
  using System.ServiceModel.Diagnostics;
  using System.Xml;
  public abstract class MessageEncodingBindingElement :
  BindingElement
  {
    protected MessageEncodingBindingElement( )
    {
    }
    protected
MessageEncodingBindingElement(MessageEncodingBindingElement elementToBeCloned)
      : base(elementToBeCloned)
    {
    }
    public abstract AddressingVersion AddressingVersion { get; set; }
    public abstract MessageEncoderFactory
CreateMessageEncoderFactory( );
      internal protected virtual void OnImportPolicy(XmlElement assertion,
MessageVersion messageVersion, MetadataImporter importer,
PolicyConversionContext context) { }
  }
}
```

Example Message Encoder Factory

```
namespace System.ServiceModel.Channels
{
    using System;
    public abstract class MessageEncoderFactory
    {
      protected MessageEncoderFactory( )
      {
      }
      public abstract MessageEncoder Encoder
      {
        get;
      }
      public abstract MessageVersion MessageVersion
      {
        get;
      }
      public virtual MessageEncoder CreateSessionEncoder( )
      {
        return Encoder;
      }
    }
}
```

From the above APIs, the MessageEncodingBindingElement class may be implemented by each binding element class that represents a requirements to use a particular MessageEncoder in the runtime stack. Further, the interface may be used to serve as a factory of MessageEncoders. Moreover, note that the properties on MessageEncodingBindingElement may correspond directly to the properties on MessageEncoder.

Text message encoder may be used to support a message (e.g., SOAP) over Text XML. This may includes support for various versions of the message, e.g., SOAP 1.1 (text/xml) as well as SOAP 1.2 (application/soap+xml). The following table provides some quote considerations give for the text message API to follow. As with other specific implementations, these are for illustrative purposes only.

| Quota | Description | Type | Valid values | Default |
|---|---|---|---|---|
| MaxWritePoolSize | How many MessageWriters to pool (each for Streamed, Buffered) | int | (1, MaxValue) | 16 |
| MaxReadPoolSize | How many MessageReaders to pool (each for Streamed, Buffered) | int | (1, MaxValue) | 64 |
| MaxXmlReaderAllocation | The maximum amount of memory to allocate in our XML Readers | int | (1, MaxValue) | 16384 |

Example Text Message Encoding Binding Element

```
namespace System.ServiceModel.Channels
{
  using System.Collections.Generic;
  using System.ServiceModel.Description;
  using System.Text;
  using System.Runtime.Serialization;
  using System.ServiceModel.Channels;
  using System.ServiceModel;
  using System.Xml;
  public sealed class TextMessageEncodingBindingElement :
MessageEncodingBindingElement, IWsdlExportExtension,
IPolicyExportExtension
  {
    public TextMessageEncodingBindingElement( )
      : this(MessageVersion.Default, TextEncoderDefaults.Encoding)
    {
    }
    public TextMessageEncodingBindingElement(MessageVersion
messageVersion, Encoding writeEncoding)
    {
      throw new NotImplementedException( );
    }
TextMessageEncodingBindingElement(TextMessageEncodingBinding-
ElementelementToBeCloned)
      : base(elementToBeCloned)
    {
      throw new NotImplementedException( );
    }
    public override AddressingVersion AddressingVersion
    {
      get
      {
        throw new NotImplementedException( );
      }
      set
      {
        throw new NotImplementedException( );
      }
    }
    public int MaxReadPoolSize
    {
      get
      {
        throw new NotImplementedException( );
      }
      set
      {
        throw new NotImplementedException( );
      }
    }
    public int MaxWritePoolSize
    {
      get
      {
        throw new NotImplementedException( );
      }
      set
      {
        throw new NotImplementedException( );
      }
    }
    public XmlDictionaryReaderQuotas ReaderQuotas
    {
      get
      {
        throw new NotImplementedException( );
      }
    }
    public MessageVersion MessageVersion
    {
      get
      {
        throw new NotImplementedException( );
      }
      set
      {
        throw new NotImplementedException( );
      }
    }
    public Encoding WriteEncoding
    {
      get
      {
        throw new NotImplementedException( );
      }
      set
      {
        throw new NotImplementedException( );
      }
    }
    public override IChannelFactory<TChannel>
BuildChannelFactory<TChannel>(BindingContext context)
    {
      throw new NotImplementedException( );
    }
    public override IChannelListener<TChannel>
BuildChannelListener<TChannel>(BindingContext context)
    {
      throw new NotImplementedException( );
    }
    public override bool
CanBuildChannelListener<TChannel>(BindingContext context)
    {
```

```
        throw new NotImplementedException( );
    }
    public override BindingElement Clone( )
    {
        throw new NotImplementedException( );
    }
    public override MessageEncoderFactory
CreateMessageEncoderFactory( )
    {
        throw new NotImplementedException( );
    }
    public override T GetProperty<T>(BindingContext context)
    {
        throw new NotImplementedException( );
    }
    public void ExportPolicy(MetadataExporter exporter,
PolicyConversionContext context)
    {
        throw new NotImplementedException( );
    }
    internal protected override void OnImportPolicy(XmlElement
assertion, MessageVersion messageVersion, MetadataImporter importer,
PolicyConversionContext context)
    {
        throw new NotImplementedException( );
    }
  }
}
```

Note that similar to the general message encoder API, the TextMessageEncodingBindingElement class represents an implementation of MessageEncodingBindingElement that represents a requirement to use a TextMessageEncoder in the runtime stack. Accordingly, the class may serve as a factory of TextMessageEncoder instances. Further, the properties on TextMessageEncodingBindingElement may correspond directly to the properties on TextMessageEncoder.

The following binary message encoder may be used to support messages (e.g., SOAP) over binary XML. Note that this embodiment may not support certain message formats (e.g., SOAP version 1.1) and/or properties (e.g., charset) as those in the text-based encoder. Further, the content type is typically application/soap+msbin1. The following table provides some quote considerations give for the text message API to follow. As with other specific implementations, these are for illustrative purposes only.

| Quota | Description | Type | Valid values | Default |
|---|---|---|---|---|
| MaxWritePoolSize | How many MessageWriters to pool (each for Streamed, Buffered) | int | (1, MaxValue) | 16 |
| MaxReadPoolSize | How many MessageReaders to pool (each for Streamed, Buffered) | int | (1, MaxValue) | 64 |
| MaxXmlReaderAllocation | The maximum amount of memory to allocate in our XML Readers | int | (1, MaxValue) | 16384 |

Example Binary Message Encoding Binding Element

```
namespace System.ServiceModel.Channels
{
    using System.Reflection;
    using System.ServiceModel.Description;
    using System.Runtime.Serialization;
    using System.ServiceModel;
    using System.Xml;
    using System.Collections.Generic;
    public sealed class BinaryMessageEncodingBindingElement :
MessageEncodingBindingElement, IWsdlExportExtension,
IPolicyExportExtension
    {
        public BinaryMessageEncodingBindingElement( )
        {
            throw new NotImplementedException( );
        }
        public override AddressingVersion AddressingVersion
        {
            get
            {
                throw new NotImplementedException( );
            }
            set
            {
                throw new NotImplementedException( );
            }
        }
        public int MaxReadPoolSize
        {
            get
            {
                throw new NotImplementedException( );
            }
            set
            {
                throw new NotImplementedException( );
            }
        }
        public int MaxWritePoolSize
        {
            get
            {
                throw new NotImplementedException( );
            }
            set
            {
                throw new NotImplementedException( );
            }
        }
        public XmlDictionaryReaderQuotas ReaderQuotas
        {
            get
            {
                throw new NotImplementedException( );
            }
        }
        public int MaxSessionSize
        {
```

```
        get
        {
            throw new NotImplementedException( );
        }
        set
        {
            throw new NotImplementedException( );
        }
    }
    public override IChannelFactory<TChannel>
BuildChannelFactory<TChannel>(BindingContext context)
    {
        throw new NotImplementedException( );
    }
    public override IChannelListener<TChannel>
BuildChannelListener<TChannel>(BindingContext context)
    {
        throw new NotImplementedException( );
    }
    public override T GetProperty<T>(BindingContext context)
    {
        throw new NotImplementedException( );
    }
    public override bool
CanBuildChannelListener<TChannel>(BindingContext context)
    {
        throw new NotImplementedException( );
    }
    public override BindingElement Clone( )
    {
        throw new NotImplementedException( );
    }
    public override MessageEncoderFactory
CreateMessageEncoderFactory( )
    {
        throw new NotImplementedException( );
    }
    public void ExportPolicy(MetadataExporter exporter,
PolicyConversionContext policyContext)
    {
        throw new NotImplementedException( );
    }
    internal protected override void OnImportPolicy(XmlElement
assertion, MessageVersion messageVersion, MetadataImporter
importer, PolicyConversionContext policyContext)
    {
        throw new NotImplementedException( );
    }
}
```

Similar to the text-based encoder API above, the BinaryMessageEncodingBindingElement class represents an implementation of MessageEncodingBindingElement that represents a requirement to use a BinaryMessageEncoder in the runtime stack. Accordingly, the class may serve as a factory of BinaryMessageEncoder instances. Further, the properties on BinaryMessageEncodingBindingElement may correspond directly to the properties on BinaryMessageEncoder.

As mentioned above, other transports mechanisms are also supported herein. For example, the following MTOM message encoding binding may be used to support messages (e.g., SOAP) using such transport.

Example MTOM Message Encoding Binding Element

```
namespace System.ServiceModel.Channels
{
    using System.Collections.Generic;
    using System.ServiceModel.Description;
    using System.Runtime.Serialization;
    using System.ServiceModel.Channels;
    using System.ServiceModel;
    using System.Text;
    using System.Xml;
    public sealed class MtomMessageEncodingBindingElement :
MessageEncodingBindingElement, IWsdlExportExtension,
IPolicyExportExtension
    {
        public MtomMessageEncodingBindingElement( )
            : this(MessageVersion.Default, TextEncoderDefaults.Encoding)
        {
        }
        public MtomMessageEncodingBindingElement(MessageVersion
messageVersion, Encoding writeEncoding)
        {
            throw new NotImplementedException( );
        }
        public override AddressingVersion AddressingVersion
        {
            get
            {
                throw new NotImplementedException( );
            }
            set
            {
                throw new NotImplementedException( );
            }
        }
        public int MaxReadPoolSize
        {
            get
            {
                throw new NotImplementedException( );
            }
            set
            {
                throw new NotImplementedException( );
            }
        }
        public int MaxWritePoolSize
        {
            get
            {
                throw new NotImplementedException( );
            }
            set
            {
                throw new NotImplementedException( );
            }
        }
        public XmlDictionaryReaderQuotas ReaderQuotas
        {
            get
            {
                throw new NotImplementedException( );
            }
        }
        public Encoding WriteEncoding
        {
            get
            {
                throw new NotImplementedException( );
            }
            set
            {
                throw new NotImplementedException( );
            }
        }
        public MessageVersion MessageVersion
        {
            get
            {
                throw new NotImplementedException( );
            }
            set
            {
                throw new NotImplementedException( );
            }
        }
        public override IChannelFactory<TChannel>
BuildChannelFactory<TChannel>(BindingContext context)
        {
```

-continued

```
        throw new NotImplementedException( );
    }
    public override bool
CanBuildChannelFactory<TChannel>(BindingContext context)
    {
        throw new NotImplementedException( );
    }
    public override IChannelListener<TChannel>
BuildChannelListener<TChannel>(BindingContext context)
    {
        throw new NotImplementedException( );
    }
    public override bool
CanBuildChannelListener<TChannel>(BindingContext context)
    {
        throw new NotImplementedException( );
    }
    public override BindingElement Clone( )
    {
        throw new NotImplementedException( );
    }
    public override MessageEncoderFactory
CreateMessageEncoderFactory( )
    {
        throw new NotImplementedException( );
    }
    public override T GetProperty<T>(BindingContext context)
    {
        throw new NotImplementedException( );
    }
    public void ExportPolicy(MetadataExporter exporter,
PolicyConversionContext policyContext)
    {
        throw new NotImplementedException( );
    }
    internal protected override void OnImportPolicy(XmlElement
assertion, MessageVersion messageVersion, MetadataImporter
importer, PolicyConversionContext context)
    {
        throw new NotImplementedException( );
    }
  }
}
```

Of course, other encoding mechanisms are also contemplated herein. Further, as previously noted, the above APIs use proprietary naming and other features. Nevertheless, any specific encoding mechanism and/or APIs shown are used herein for illustrative purposes only and is not meant to limit or otherwise narrow embodiments described herein.

Further note that although the above embodiments (e.g., formatting and encoding) were described in terms of developer code used to implement these features, other embodiments also allow for configuration or other settings that would allow an administrator or other user to implement these embodiments. For example, the above bindings, encodings, formatters, etc., of services and proxies for messages are modifiable through configuration mechanisms. In other words, the above embodiments may be programmatically implemented, but also supported herein are configuration settings that allow these features to be implemented and modified at deployment time. Such embodiments, therefore, allow for the decoupling of the developed code from the environment that the code is executed in.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts is the recitation of the claims—and in the following description of the flow diagrams for FIGS. 3-10—typically is used to indicate the desired specific use of such terms.

As previously mentioned, FIGS. 3-10 illustrate flow diagrams for various exemplary embodiments of the present invention. The following description of FIGS. 3-10 will occasionally refer to corresponding elements from FIGS. 1, 2A, and 2B. Although reference may be made to a specific element from these Figures, such references are used for illustrative purposes only and are not meant to limit or otherwise narrow the scope of the described embodiments unless explicitly claimed.

Figure 3:
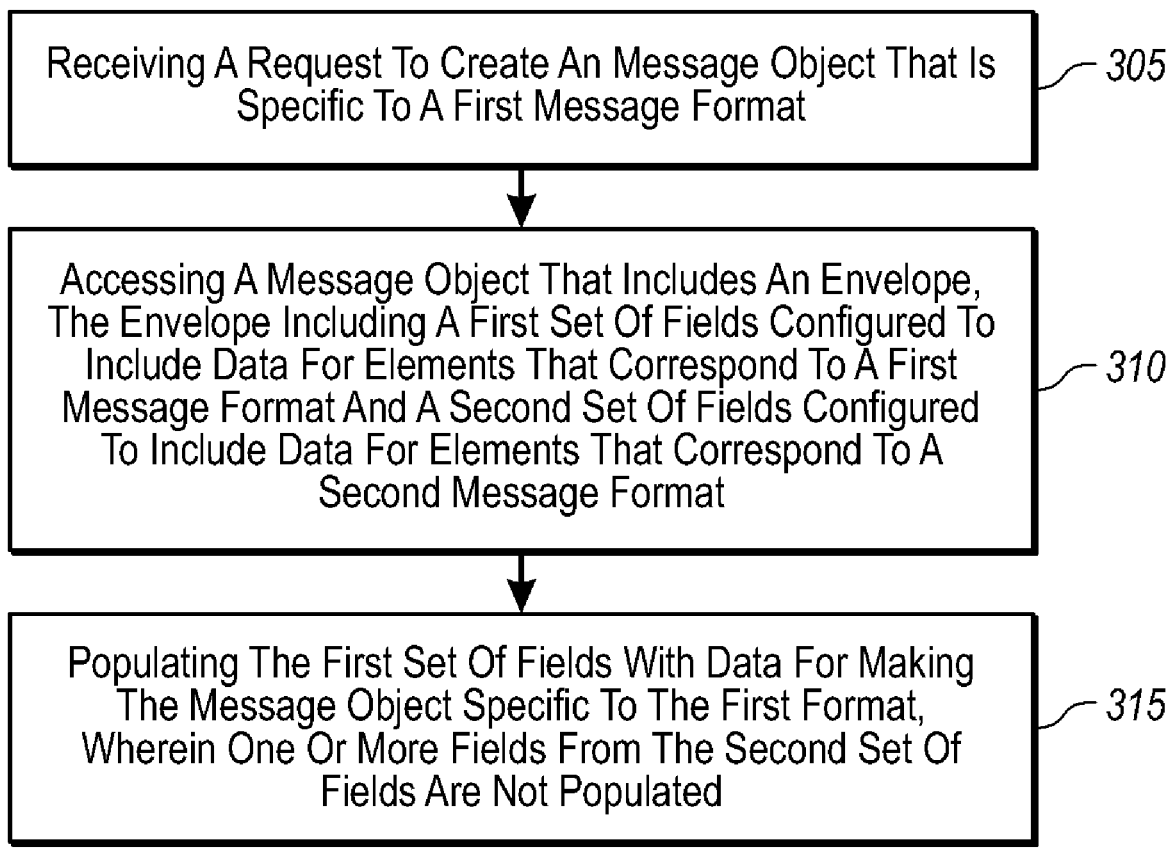
FIG. 3 illustrates a flow diagram for a method of using a single message object to create message instances of multiple messaging formats in accordance with example embodiments.

FIG. 3 illustrates a flow diagram for a method 300 of using a single message object to create message instances of multiple messaging formats. Method 300 includes an act of receiving 305 a request to create a message object specific to A first message format. For example, message formatters 120, 145 may receive a request to create a message object specific to a versioning of a message (e.g., SOAP 1.1, 1.2). Method 300 also includes an act of accessing 310 a message object that includes an envelope. For example, message formatter 120, 145 may access a message object with an envelope including a first set of fields configured to include data for elements that correspond to a first message format and a second set of fields configured to include data for elements that correspond to a second message format.

Method 300 also includes a step for populating 315 the first set of fields with data for creating an instance of the message object specific to the first format. For instance, message formatters 120, 145 may create an instance of a message object specific to a versioning of a message by populating the fields corresponding to the format desired. Note that in such that some of the fields from other formats or versions may not be populated.

Also note that the first set of fields may have overlapping properties with the second set of fields such that at least one of the fields populated with data corresponds to a field from the second set of fields. In fact, in some cases all of the first set of fields may be included within the second set of fields.

Figure 4A:
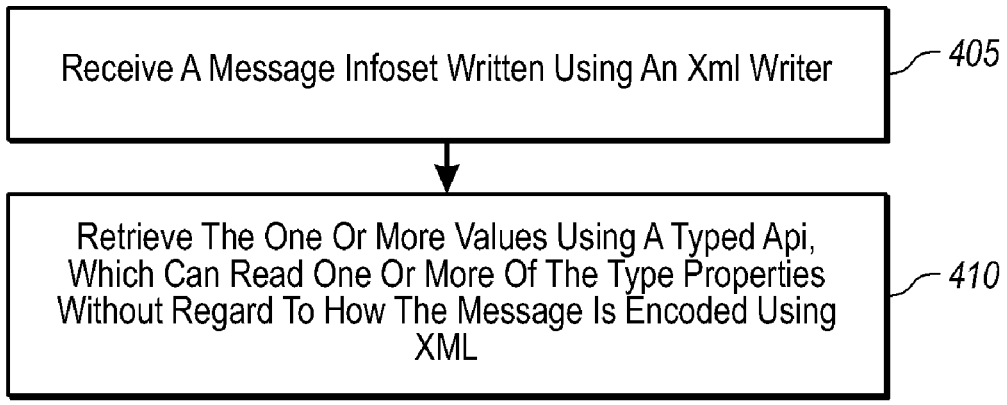
FIGS. 4A and 4B illustrate flow diagrams for methods of simultaneously exposing a message infoset as both an XML view and a Type view in accordance with example embodiments.

FIG. 4A illustrates a flow diagram for a method 400 of simultaneously exposing a message infoset as both an XML view and a Type view, which are synced. Method 400 includes an act of receiving 405 a message infoset written using an XML. writer. For example, message formatter 120 may use an XML writer to create a message infoset, which can be received by message formatter 145 at the server 155 (or vice-versa). Note that the message infoset will include a common set of headers that exposes value(s) as both XML and typed properties. Method 400 also includes an act of retrieving 410 the value(s) using a Typed API. For example, using the illustration above, message formatter 145 on the server may use a Typed API, which can read the type properties without regard to how the message is encoded using XML. Note that the typed properties may be such things as URI string values. Also note that the infoset may be a SOAP object.

Figure 4B:
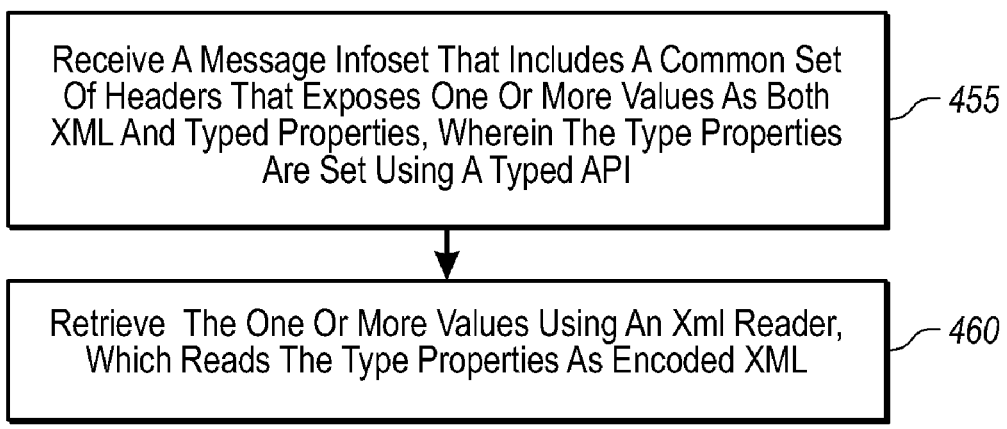

FIG. 4B illustrates a flow diagram for another method 450 of simultaneously exposing a message infoset as both an XML view and a Type view. In this embodiment, method 450 includes an act of receiving 455 a message infoset that includes a common set of headers that exposes value(s) as both XML and typed properties, wherein the type properties are set using a Typed API. For example, message formatter 145 may use a Typed API to set the type properties on a message infoset, which can be received by message formatter

120 at the client 105 (or vice-versa). Method 450 also includes an act of retrieving 410 the value(s) using an XML reader, which reads the type properties as encoded XML. For example, using the illustration above, message formatter 120 on the client 105 may use a XML reader to read the type properties set by the Typed API. Note that the typed properties may be such things as URI string values. Also note that the infoset may be a SOAP object.

Note that the retrieval using the XML reader typically include first identifying an index to a header using a XML name encapsulating the one or more values; then retrieving an XML dictionary reader specific to the header that includes a read operation; and finally passing the header to the read operation for creating a typed representation of the header. Also note that the XML name may be a qualified name including a name and namespace.

Figure 5:
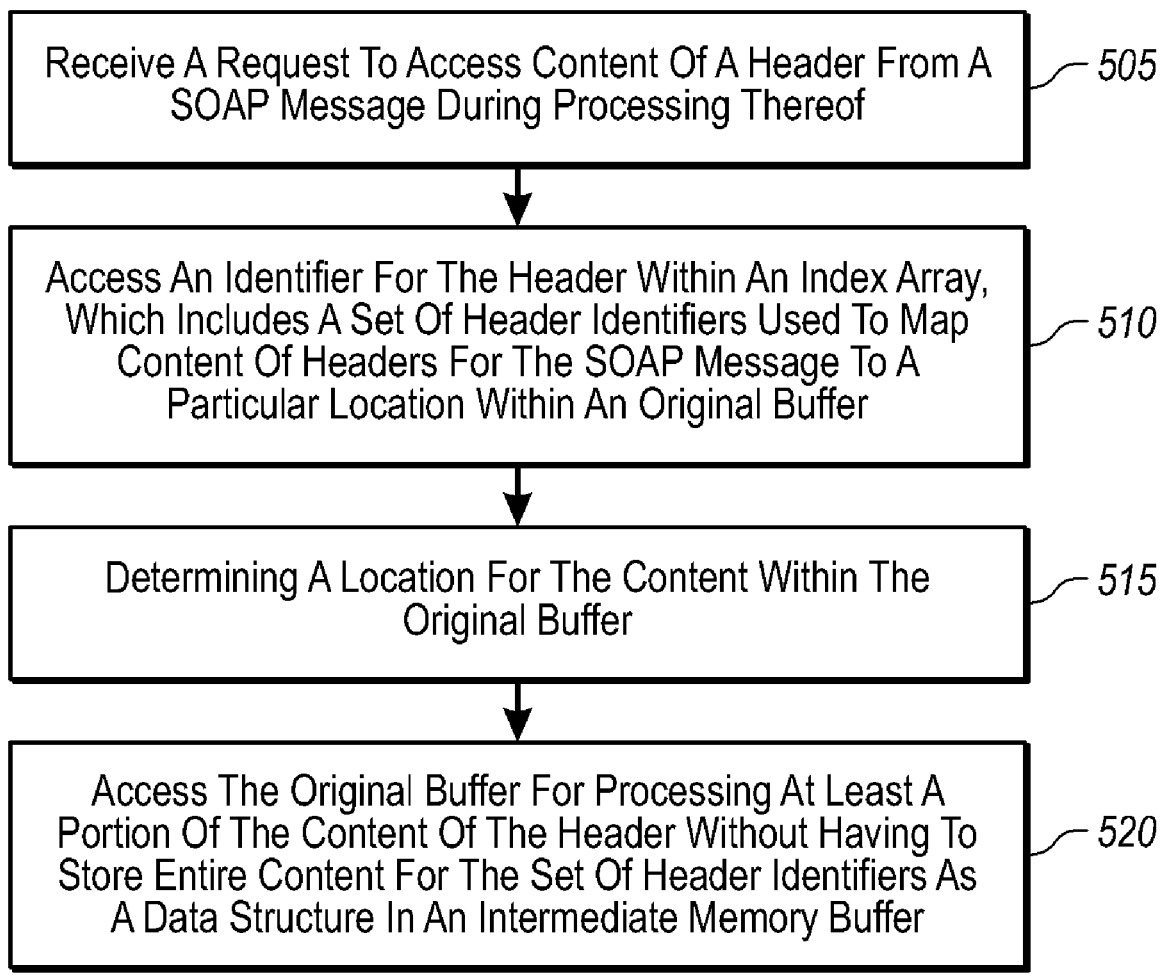
FIG. 5 illustrates a flow diagram for a method of indexing headers for a SOAP message as an array in accordance with example embodiments.

FIG. 5 illustrates a flow diagram for a method 500 that reduces buffer requirements for processing a SOAP message by indexing headers as an array, while still providing random access thereto. Method 500 includes an act of receiving 505 a request to access content of a header from a SOAP message during processing thereof. For example, client 105 or server 155 may receive a request to access content of a header from a SOAP message 110, 150. Method 500 further includes an act of accessing 510 an identifier for the header within an index array. For example, client 105 or server 105 may access an identifier for the header within an index array, which includes a set of header identifiers used to map content of headers for the SOAP message to a particular location within an original buffer. Note that the identifier may be a qualified name or some other unique identifier.

Based on a reference pointer corresponding to the identifier for the header, method 500 further includes a step for determining 515 a location for the content within the original buffer. Note that the location may be based on the order in which the header appears relative to other headers within the SOAP message such that the reference pointer is a number of a particular ordering for the header. Further, based on the determined location, method 500 includes an act of accessing 520 the original buffer for processing at least a portion of the content of the header without having to store entire content for the set of header identifiers as a data structure in an intermediate memory buffer. Note that not all the headers for the SOAP message may be indexed and the content may include attributes, elements, or values.

Figure 6A:
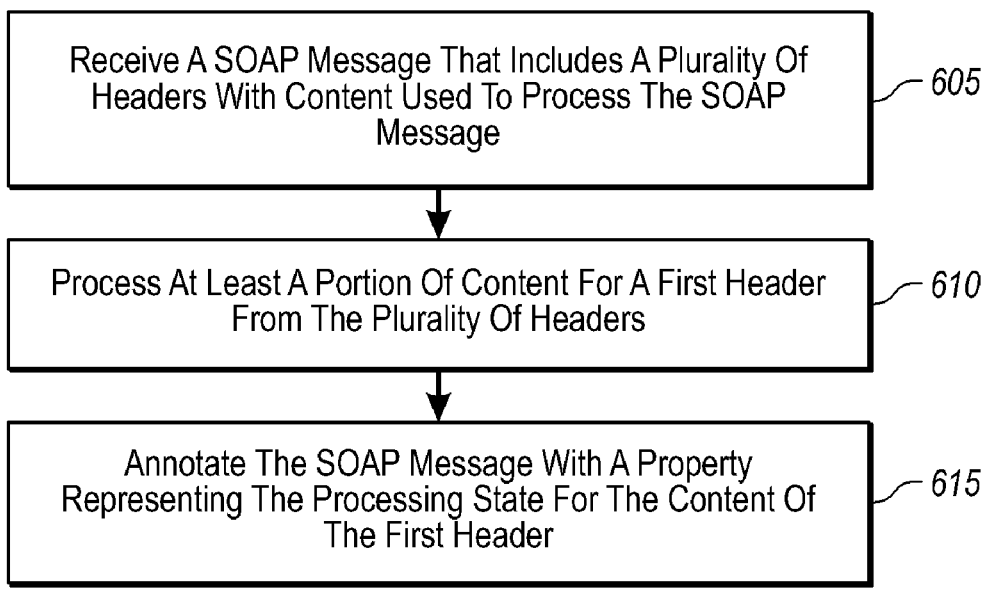
FIGS. 6A and 6B illustrate flow diagrams for methods of efficiently processing a SOAP message by attaching thereto properties representing processing state for portions of the message in accordance with example embodiments.

FIG. 6A illustrates a flow diagram for a method 600 of efficiently processing a SOAP message by attaching properties to a message object representing processing state of headers for the message. Method 600 includes an act of receiving 605 a SOAP message that includes a plurality of headers with content used to process the SOAP message. For example, either client 105 or server 155 may receive (e.g., by creating the message, or by receiving it from another endpoint) a SOAP message that includes a plurality of headers used in processing the SOAP message.

Method 600 further includes an act of processing 610 at least a portion of content for a first header from the plurality of headers. For example, client 105 or server 155 may process portion(s) of headers for the message in accordance with any well known manner. Based on the processing, method 600 also includes a step for annotating 615 a message object with a property representing the processing state for the content of the first header. For example, upon processing portion(s) of the headers, client 105 or server 155 may attach or annotate properties on a message representing processing state for the content such that other operations can use the property for further processing of the SOAP message.

Note that in some embodiments, the property may be marked to indicate that either it should or should not persist upon serialization of the SOAP message. This may be done either by the user or automatically by the system. Note that a default may also be set, e.g., such that a property or state information that is not specifically marked is removed or lost upon or before serialization. This may be an appropriate decision if the message property contains sensitive key information, for instance.

Figure 6B:
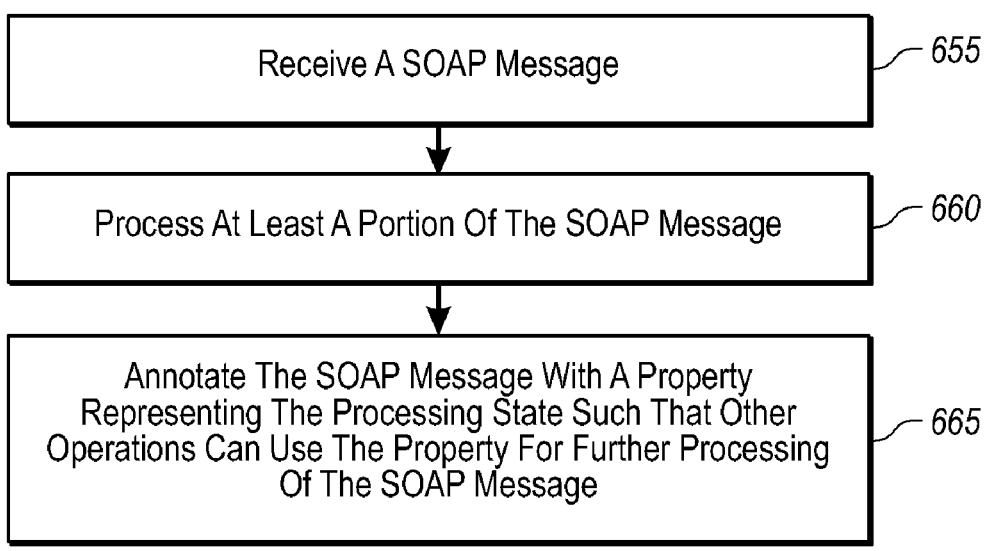

Similar to above, FIG. 6B illustrates a flow diagram for a method 650 of efficiently processing a SOAP message by attaching properties to a message object representing processing state for the SOAP message. Method 650 includes an act of receiving 655 a SOAP message. For example, either client 105 or server 155 may receive (e.g., by creating the message, or by receiving it from another endpoint) a SOAP message (e.g., request messages 110, response message 150). Method 650 further includes an act of processing 660 at least a portion of the SOAP message. For example, client 105 or server 155 may process portion(s) of headers for the message in accordance with any well known manner. Based on the processing, method 600 also includes a step for annotating 665 a message object with a property representing the processing state such that other operations can use the property for further processing of the SOAP message.

Note that the SOAP message may includes header(s) with content, wherein the property represents processing state of the content for the header(s). Alternatively, or in conjunction, the SOAP message may include a body portion(s) with content, wherein the property represents processing state of the content for the body portion(s). In addition, the property may represents processing state related to environmental information about how a message was received off a communication connection.

Further note that similar to above, some embodiments, the property may be marked to indicate that either it should or should not persist upon serialization of the SOAP message. This may be done either by the user or automatically by the system. Note that a default may also be set, e.g., such that a property or state information that is not specifically marked is removed or lost upon or before serialization. This may be an appropriate decision if the message property contains sensitive key information, for instance.

Figure 7:
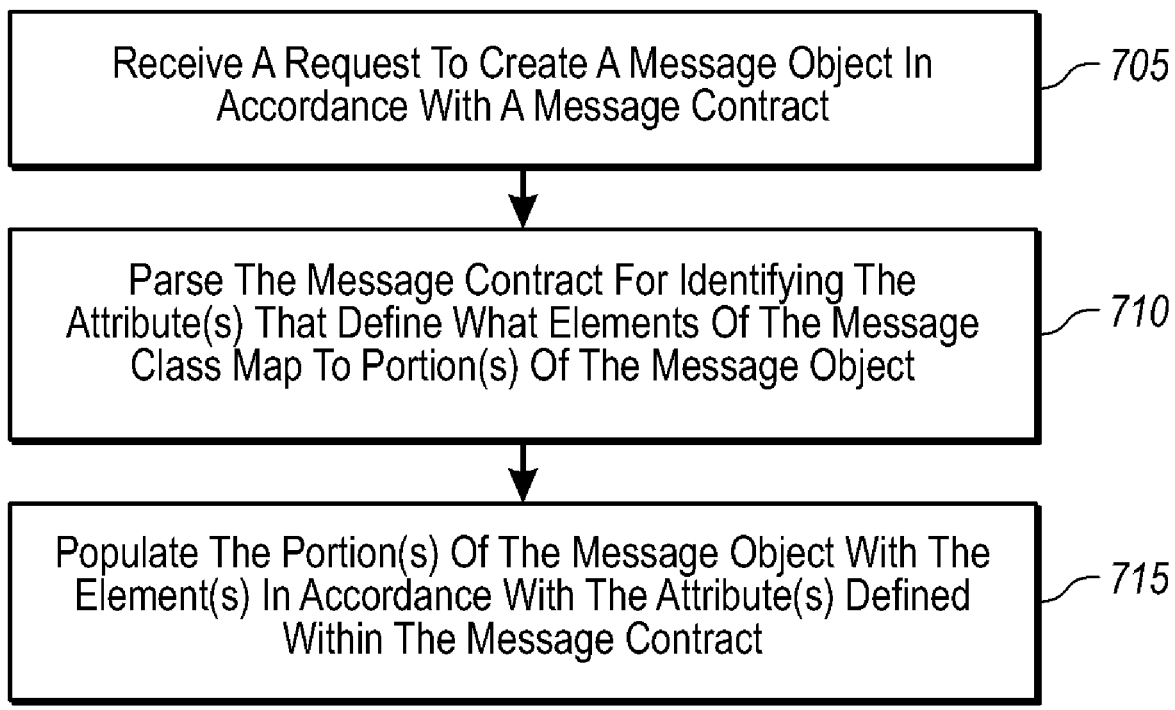
FIG. 7 illustrates a flow diagram for a method of formatting a layout of a message object using a message contract in accordance with example embodiments.

FIG. 7 illustrates a flow diagram of a method 700 of formatting a layout of a message object using a message contract that maps elements to various portions thereof. Method 700 includes an act of receiving 705 a request to create a message object in accordance with a message contract. For example, message formatter 230 may receive a request to create a message object 240 in accordance with message contract 205, which includes attribute(s) (e.g., header attribute 215, body attribute 230, etc.) corresponding to element(s) 210, 225 of a message class.

Method 700 further includes an act of parsing 710 the message contract for identifying the attribute(s) that define what elements of the message class map to portion(s) of the message object. Thereafter, method 700 includes an act of populating the portion(s) of the message object with the element(s) in accordance with the attribute(s) defined within the message contract. More specifically, message formatter 230 can parse message contract 205 for identifying the attribute(s) (e.g., header attribute 215, body attribute 220, etc.) that define what elements 210, 225 of the message class map to portion(s) of the message object 240. Once the attribute(s) are identified, the appropriate portion(s) of the message object 240 can be populated with the corresponding element(s) 210, 225.

For example, elements 210 corresponding to a header attribute 215 should be populated in the header portion of the message object 240. Similarly, those elements 225 corresponding to a body attribute 220 should be populated in the body portion of the message object. Note that the element(s) may include the following forms type, struct, field, property, or operation.

Figure 8:
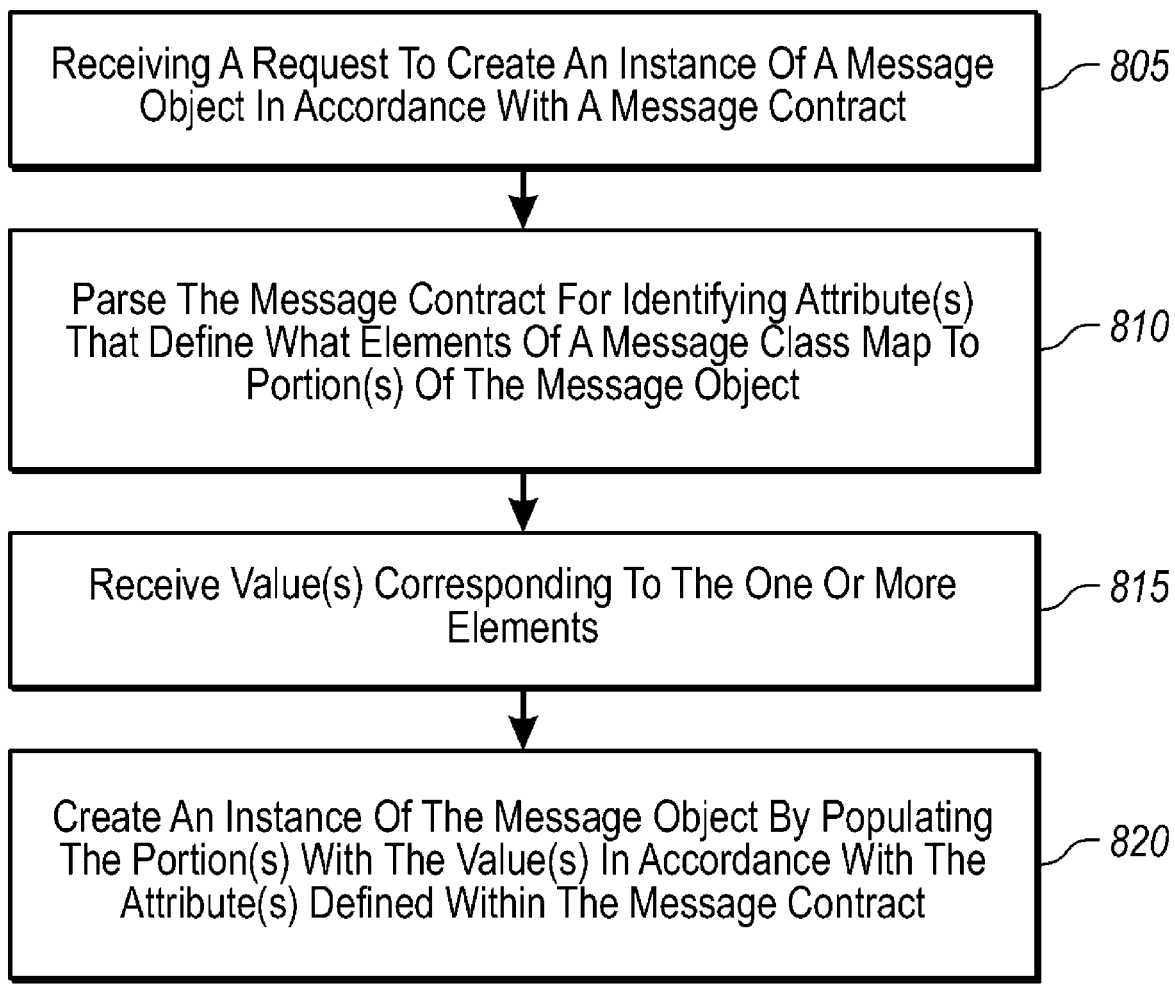
FIG. 8 illustrates a flow diagram for a method of creating an instance of a message object by using a message contract in accordance with example embodiments.

FIG. 8 illustrates a flow diagram for a method 800 of creating an instance of a message object by using a message contract that maps elements to various portions thereof. Method 800 includes an act of receiving 805 a request to create an instance of a message object in accordance with a message contract. For example, similar to above, message formatter 230 may receive a request to create a message object 240 in accordance with the message contract 205, which includes attribute(s) (e.g., header attribute 215, body attribute 220, etc.) corresponding to element(s) 210, 225 of a message class.

Method 800 further includes an act of parsing 810 the message contract for identifying the attribute(s) that define what elements of the message class map to portion(s) of the message object. Further, method 800 includes an act of receiving 815 value(s) corresponding to the element(s). Thereafter, method 800 includes an step for crating 820 an instance of the message object by populating the portion(s) of the message object with the value(s) in accordance with the attribute(s) defined within the message contract. More specifically, message formatter 230 can parse message contract 205 for identifying the attribute(s) (e.g., header attribute 215, body attribute 230, etc.) that define what elements 210, 225 of the message class map to portion(s) of the message object 240. Further, message formatter 230 may receive message values 245 such that once the attribute(s) are identified, the appropriate portion(s) of the message object 240 can be populated with the corresponding value(s) 210, 225 for creating an instance 250 of an output message.

Figure 9:
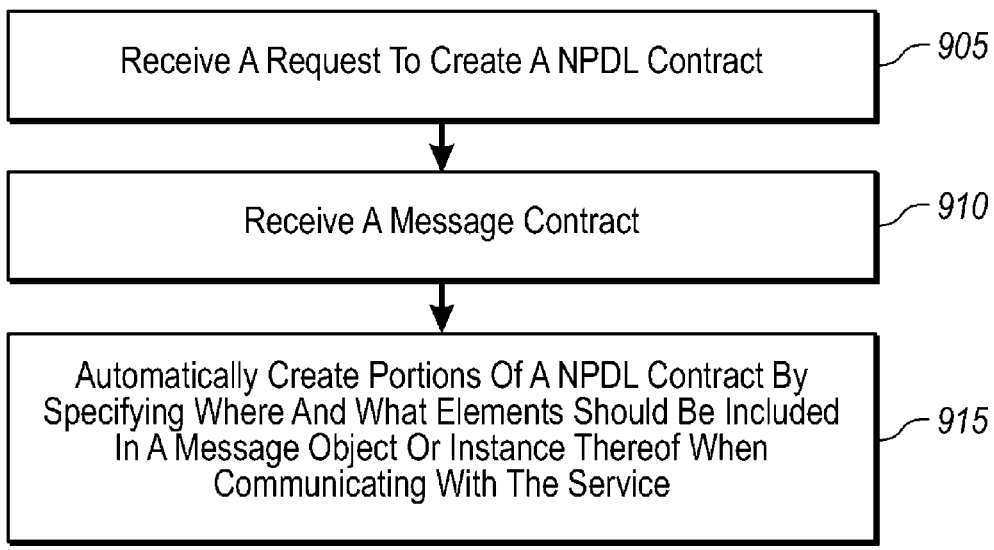
FIG. 9 illustrates a flow diagram for a method of automatically creating a NPDL contract in accordance with example embodiments.

FIG. 9 illustrates a flow diagram for a method 900 of automatically creating one or more portions of an NPDL contract used by clients in communicating with a service. Method 900 includes an act of receiving 905 a request to create a NPDL contract. For example, a NPDL module within server 155 may receive a request to create a NPDL contract (e.g., a WSDL document), which defines how a client 105 is to communicate with a service 155. Further, method 900 includes an act of receiving 910 a message contract. For example, the NPDL module may receive message contract 205, which includes attribute(s) (e.g., header attributes 215, body attributes 220) corresponding to element(s) 215, 225 of a message class.

Based on the received message contract, method 900 also includes a step for creating 915 at least a portion of the NPDL contract by specifying where and what elements should be included in a message object or instance thereof when communicating with the service. More specifically, upon receiving the message contract 205, the NPDL contract module may automatically create a NPDL contract 275, which at least a portion thereof is based on the message contract 205 and stored in contract store 280. Note that similar embodiments as those described above with regard to message contract 205 may also apply to this embodiment.

Figure 10:
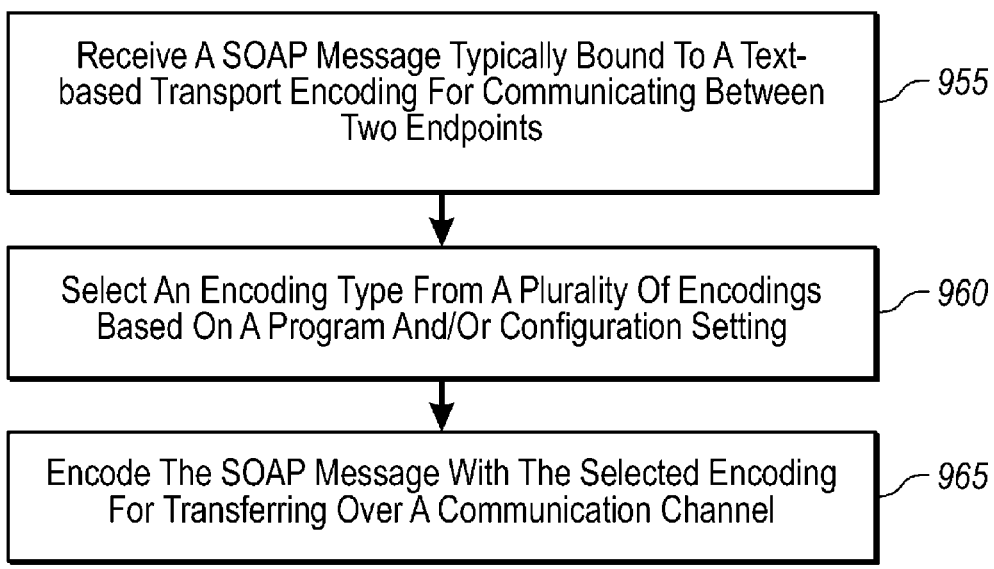
FIG. 10 illustrates a flow diagram for a method of determining a type of encoding to use for a SOAP message in accordance with example embodiments.

FIG. 10 illustrates a flow diagram for a method 950 of determining a type of encoding to use for a SOAP message, without requiring only a text-based encoding. Method 950 includes an act of receiving 955 a SOAP message typically bound to a text-based transport encoding for communicating between two endpoints. For example, message encoder factories 125, 135 may receive a SOAP message typically bound to a text-based transport encoding. Method 950 further includes an act of selecting 960 an encoding type from a plurality of encodings based on a program and/or configuration setting. For example, message encoder factories 125, 135 may select a binding or encoding mechanism from a plurality of encodings including text-based, binary based, MTOM, or some proprietary encoding.

Thereafter, method 950 includes a step for encoding 965 the SOAP message with the selected encoding for transferring over a communication channel. For example, after selecting the type of encoding, encoders 125, 135 can encode a SOAP message in accordance therewith for communication and other purposes. Note, that the selection of a transport may also be based on the selected encoding. For instance, the transports may include TCP/IP, HTTP, UDP, or a proprietary transport. Further note that the selection of the transport may also be based on a priority ranking set for each of the plurality of transport settings or by a default setting.

Also note that when a proprietary encoding is used, such encoder can encode the SOAP message into an alternative message format other than SOAP. For example, the SOAP message may be formatted into an alternative message format such as SMTP, MSMQ, etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a distributed messaging system, a method of using a single message class which supports each of a plurality of distinct message formats to create a message object for a particular message format, the particular message format being one of the plurality of distinct message formats, the method comprising:

receiving a request to create a message object that is specific to a first message format, wherein the message object is a SOAP object;

accessing a message class which supports each of a plurality of distinct message formats, each of the plurality of distinct message formats comprising a complete message in the each message format, the message class including an envelope, and the envelope comprising a first set of fields and a second set of fields, the first set of fields corresponding to the first message format and used only upon receiving a request to create a message object specific to the first message format, the second set of fields corresponding to a second message format and used only upon receiving a request to create a message object specific to the second message format;

parsing a message contract corresponding to the request to create a message object;

identifying contract attributes, the contract attributes defining a mapping of elements of the message class to portions of the message object;

accessing a set of message values corresponding to the request wherein each of the set of message values is associated with a contract attribute;

based upon the identified attributes and mapping of elements to portions of the message object, populating the first set of fields with message values according to the association with the contract attributes and the mapping of elements;

not populating at least one field of the second set of fields which correspond to the second message format;

creating a message object specific to the first message format, the message object comprising fields corresponding to the first message format populated with corresponding message values, and the message object omitting at least one field from the second set of fields corresponding to the a second message format; and creating a network protocol description language (NPDL) contract corresponding to the request, the NPDL contract defining how a client is to communicate with a service.

2. The method of claim 1, wherein one or more of the first set of fields are included in the header part.

3. The method of claim 1, wherein one or more of the first set of fields are included in the body part.

4. The method of claim 1, wherein the first and second sets of fields correspond to a version 1.1 and 1.2 of the SOAP format, respectively.

5. The method of claim 1, wherein one or more of the first set of fields are included within a header portion of the message object and one or more of the first set of fields are included within a body portion of the message object.

6. In a distributed messaging system, a computer program product comprising one or more physical computer-readable storage media having encoded thereon computer-executable instructions for implementing a method of using a single message class which supports each of a plurality of distinct message formats to create a message object for a particular message format, the particular message format being one of the plurality of distinct message formats, the method comprising:

receiving a request to create a message object that is specific to a first message format, wherein the message object is a SOAP object;

accessing a message class which supports each of a plurality of distinct message formats, each of the plurality of distinct message formats comprising a complete message in the each message format, the message class including an envelope, and the envelope comprising a first set of fields and a second set of fields, the first set of fields corresponding to the first message format and used only upon receiving a request to create a message object specific to the first message format, the second set of fields corresponding to a second message format and used only upon receiving a request to create a message object specific to the second message format;

parsing a message contract corresponding to the request to create a message object;

identifying contract attributes, the contract attributes defining a mapping of elements of the message class to portions of the message object;

accessing a set of message values corresponding to the request wherein each of the set of message values is associated with a contract attribute;

based upon the identified attributes and mapping of elements to portions of the message object, populating the first set of fields with message values according to the association with the contract attributes and the mapping of elements;

not populating at least one field of the second set of fields which correspond to the second message format;

creating a message object specific to the first message format, the message object comprising fields corresponding to the first message format populated with corresponding message values, and the message object omitting at least one field from the second set of fields corresponding to the a second message format; and creating a network protocol description language (NPDL) contract corresponding to the request, the NPDL contract defining how a client is to communicate with a service.

7. The computer program product of claim 6, wherein one or more of the first set of fields are included in the header part.

8. The computer program product of claim 6, wherein one or more of the first set of fields are included in the body part.

9. The method of claim 1, wherein the first and second sets of fields correspond to a version 1.1 and 1.2 of the SOAP format, respectively.

10. The computer program product of claim 6, wherein one or more of the first or second set of fields are included within a header portion of the message object and one or more of the first set of fields are included within a body portion of the message object.

* * * * *

UNITED STATES PATENT AND TRADEMARK OFFICE
CERTIFICATE OF CORRECTION

PATENT NO. : 7,949,720 B2  
APPLICATION NO. : 11/469430  
DATED : May 24, 2011  
INVENTOR(S) : Michael S. Vernal et al.

It is certified that error appears in the above-identified patent and that said Letters Patent is hereby corrected as shown below:

On the Title Page  
Item (75), under "Inventors" line 8, delete "Luis Filipe Cabrera" and insert -- Luis Felipe Cabrera --, therefor.

In Item (57), under "Abstract" line 5, after "information" insert -- depending on the desired format. For example, a SOAP object may be provided --.

In column 1, line 7, delete "The" and insert -- This --, therefor.

In column 1, line 12, delete "related" and insert -- relates --, therefor.

In column 2, line 56, delete "that is specific to a" and insert -- for multiple messaging --, therefor.

In column 4, line 50, before "video" insert -- a --.

In column 7, line 47, after "they" insert -- can --.

In column 8, line 23, after "via" insert -- a --.

In column 16, line 41, after "specific" insert -- reference to the type of formatting (serialization/deserialization) is used herein for --.

Signed and Sealed this  
Nineteenth Day of July, 2011

David J. Kappos  
*Director of the United States Patent and Trademark Office*